US012521955B2

(12) United States Patent
Persson et al.

(10) Patent No.: US 12,521,955 B2
(45) Date of Patent: Jan. 13, 2026

(54) METHODS AND ARRANGEMENTS FOR CONTINUOUS MANUFACTURE OF BUILDING PANELS

(71) Applicant: Välinge Innovation AB, Viken (SE)

(72) Inventors: Hans Persson, Perstorp (SE); Darko Pervan, Viken (SE); Magnus Nilsson, Båstad (SE)

(73) Assignee: VÄLINGE INNOVATION AB, Viken (SE)

( * ) Notice: Subject to any disclaimer, the term of this patent is extended or adjusted under 35 U.S.C. 154(b) by 529 days.

(21) Appl. No.: 17/769,436

(22) PCT Filed: Oct. 19, 2020

(86) PCT No.: PCT/SE2020/050998

§ 371 (c)(1),
(2) Date: Apr. 15, 2022

(87) PCT Pub. No.: WO2021/076046

PCT Pub. Date: Apr. 22, 2021

(65) Prior Publication Data

US 2024/0009948 A1 Jan. 11, 2024

(30) Foreign Application Priority Data

Oct. 18, 2019 (SE) .................................... 1930334-6

(51) Int. Cl.
*B30B 5/06* (2006.01)
*B30B 15/08* (2006.01)

(52) U.S. Cl.
CPC .............. *B30B 5/062* (2013.01); *B30B 15/08* (2013.01)

(58) Field of Classification Search
CPC ........... B30B 5/062; B30B 15/08; B30B 5/04; B30B 5/06; B27N 7/005; B27N 3/24;
(Continued)

(56) References Cited

U.S. PATENT DOCUMENTS 2,149,614 A 3/1939 Main et al.
2,831,794 A 4/1958 Elmendorf
(Continued)

FOREIGN PATENT DOCUMENTS

DE 37 09 958 A1 10/1988
DE 4041850 A1 * 6/1992 ............... B27N 3/24
(Continued)

OTHER PUBLICATIONS

Machine translation of EP 0320712 A2—9 pages, retrieved in Apr. 2025 (Year: 2025).*

(Continued)

*Primary Examiner* — Jimmy T Nguyen
(74) *Attorney, Agent, or Firm* — Boone IP Law

(57) ABSTRACT

A continuous press arrangement for manufacture of building panels, such as floor or wall panels, includes upper and lower press belts configured to form a product path therebetween for feeding a product in a feeding direction in response to rotation of one or more drums. An upper and a lower press table each include a displaceable pressure cushion configured to facilitate a pressure zone extending along at least a portion of said path. At least one of the press tables includes one or more pressure bars disposed upstream and/or downstream the pressure cushion, in the feeding direction. The one or more pressure bars are configured to apply a pressure to the upper press belt and/or the lower press belt respectively in a direction towards the product path.

24 Claims, 10 Drawing Sheets

(58) Field of Classification Search

CPC ........ B27N 3/06; E04F 13/0866; E04F 13/16; E04F 15/02; E04F 15/102; E04F 15/107

USPC .......................................................... 100/153

See application file for complete search history.

(56) References Cited

U.S. PATENT DOCUMENTS

| | | | | |
|---|---|---|---|---|
| 4,485,733 | A | 12/1984 | Held | |
| 4,541,889 | A | 9/1985 | Held | |
| 4,723,484 | A | 2/1988 | Held | |
| 5,042,372 | A | 8/1991 | Bielfeldt | |
| 5,149,394 | A * | 9/1992 | Held | B32B 37/20 425/371 |
| 5,352,321 | A | 10/1994 | Held | |
| 5,460,764 | A | 10/1995 | Held | |
| 5,601,015 | A * | 2/1997 | Rottger | B30B 5/06 100/312 |
| 6,908,295 | B2 * | 6/2005 | Thielman | B29C 43/222 425/371 |
| 2010/0090359 | A1 | 4/2010 | Schuermann et al. | |
| 2021/0323297 | A1 | 10/2021 | Slottemo et al. | |

FOREIGN PATENT DOCUMENTS

| | | | | |
|---|---|---|---|---|
| EP | 0131879 | A1 | 1/1985 | |
| EP | 0216226 | A2 | 4/1987 | |
| EP | 0320712 | A2 * | 6/1989 | B27N 3/00 |
| EP | 0530450 | A1 | 3/1993 | |
| EP | 0 979 730 | A2 | 2/2000 | |
| EP | 1435288 | A2 | 7/2004 | |
| EP | 1484169 | A2 | 12/2004 | |
| JP | H07-314415 | A | 12/1995 | |
| JP | 2017094347 | A | 6/2017 | |
| WO | WO 2009/065769 | A2 | 5/2009 | |
| WO | WO-2014052999 | A1 * | 4/2014 | B30B 5/062 |

OTHER PUBLICATIONS

International Preliminary Report on Patentability received for PCT Patent Application No. PCT/SE20/050998, mailed on Apr. 28, 2022, 12 pages.

Supplementary European Search Report and Search Opinion received for EP Application No. 20876682.4, mailed on Oct. 11, 2023, 8 pages.

International Search Report (Form PCT/ISA/210) and the Written Opinion of the International Searching Authority (Form PCT/ISA/237) issued Dec. 18, 2020, by the Patent-och registeringsverket in corresponding International Application No. PCT/SE2020/050998. (15 pages).

Persson Hans, et al., U.S. Appl. No. 17/769,530 entitled "Methods and Arrangements for Continuous Manufacture of Building Panels", filed in the U.S. Patent and Trademark Office Apr. 15, 2022.

Persson Hans, et al., U.S. Appl. No. 17/768,730 entitled "Methods and Arrangements for Continuous Manufacture of Building Panels", filed in the U.S. Patent and Trademark Office Apr. 13, 2022.

Extended Search Report dated Apr. 4, 2024, by the European Patent Office in European Application No. EP20876412.6 (11 pages).

European Search Report and Search Opinion received for EP Application No. 20876182.5 , mailed on Oct. 10, 2023, 8 pages.

U.S. Appl. No. 17/769,530, filed Apr. 15, 2022, Hans Persson.

U.S. Appl. No. 17/768,730, filed Apr. 13, 2022, Hans Persson.

U.S. Appl. No. 18/212,014, filed Jun. 20, 2023, Andreas Slottemo.

Official Action and Search Report by the Swedish Patent and Registration Office (PRV) mailed in Swedish Application No. 1930334-6 on Apr. 17, 2020, 12 pages.

Extended European Search Report for Application No. 24207222.1 dated Feb. 7, 2025, 10 pages.

U.S. Appl. No. 17/769,530, filed Apr. 15, 2022, Hans Persson, Darko Pervan and Magnus Nilsson.

U.S. Appl. No. 17/768,730, filed Apr. 13, 2022, Hans Persson, Darko Pervan and Magnus Nilsson.

U.S. Appl. No. 17/232,687, filed Apr. 16, 2021, Andreas Slottemo and Göran Ziegler.

* cited by examiner

A-A

METHODS AND ARRANGEMENTS FOR CONTINUOUS MANUFACTURE OF BUILDING PANELS

FIELD

Embodiments of the present invention relates to methods and arrangements thereto for manufacturing laminate panels.

BACKGROUND

It is known that building panels may be manufactured by means of continuous or discontinuous press methods.

A discontinuous press typically operates in cycles wherein a product may be arranged under a displaceable press table which subsequently apply pressure to the product to thereby form a laminate.

Continuous press arrangements typically comprise a device having upper and lower continuous press belts which form a product path there between. The continuous press belts feed a product along the product path, whereby the device is configured to apply a continuous pressure to the press belts to thereby press the product to a laminate while the product is being fed along the product path.

Laminate panels in various forms are also known in the art. Laminate panels may comprise building panels, such as floor coverings, wall panels, ceiling panels or like.

A flooring may have a wooden surface. Building panels having a wooden surface may be of several different types. Solid wood flooring is formed of a solid piece of wood in form of a plank. Engineered wood flooring is formed of a surface layer of wood glued to a core. The core may be a lamella core or a wood-based panel such as plywood, MDF or HDF. The wooden surface layer may as an example have a thickness of 2-10 mm.

A wooden flooring may also be formed by gluing a wood veneer to a core, for example, a wood-based panel such as particleboard, MDF or HDF. Wood veneer is a thin wood layer, for example having a thickness of 0.2-1 mm. A building panel with a separate surface layer glued to a core of for example HDF or plywood is more moisture stable than solid wood floorings.

Compared to solid wood and engineered wood floorings, wood veneer floorings can be produced to a lower cost since only a thin wood layer is used.

However, a wood veneer layer cannot be sanded as a solid wood or engineered wood flooring can be.

As an alternative to wood floorings, laminate floorings are also available. Direct pressed laminated flooring usually comprises a core of a 6 12 mm fibre board, a 0.2 mm thick upper decorative surface layer of laminate and a 0.1-0.2 mm thick lower balancing layer of laminate, plastic, paper or like material.

A laminate surface conventionally comprises two paper sheets, a 0.1 mm thick printed decorative paper and a transparent 0.05-0.1 mm thick overlay intended to protect the decorative paper from abrasion. The transparent overlay, which is made of a-cellulose fibres, comprises small hard and transparent aluminium oxide particles, which gives the surface layer a high wear resistance.

The printed decorative paper and the overlay are impregnated with melamine resin and laminated to a wood fibre-based core under heat and pressure. The two papers have prior to pressing a total thickness of about 0.3 mm and they are after pressing compressed to about 0.2 mm.

A wood veneer may have a lower impact resistance than laminate floorings and the production cost is high, compared to laminate floorings, when high quality veneers are to be used.

Recently new “paper free” floor types have been developed with solid surfaces comprising a substantially homogenous powder mix of fibres, binders and wear resistant particles referred to as WFF (Wood Fibre Floor). The mix is applied on a wood-based panel such as MDF or HDF, and subsequently applying heat and pressure to the mix to form a surface layer on the panel. Such a flooring and process are described in WO 2009/065769.

WO 2009/065769 also discloses a thin surface layer such as wood veneer layer, which is applied on a sub-layer comprising, for example, cork or wood fibres mixed with a binder. The sub-layer is applied on wood fibre based core.

U.S. Pat. No. 2,831,794 discloses a process for manufacturing veneer panels. A green veneer is applied on a mat of resin coated core particles of ligno-cellulose fibrous particles. Adhesive is applied on the veneer to bond the veneer to the fibrous core, and to form a dense surface zone in the fibrous core. The material of the core serves to fill knot holes or open flaws in the veneer. When heat and pressure is applied, the result is the formation of a panel, with the surface layer of the particles filling whatever flaws or holes would otherwise the present in the veneer.

U.S. Pat. No. 2,419,614 discloses a coated wood product wherein a plywood is coated by a covering or overlay material consisting of mixtures of sawdust and synthetic resin. The veneer layer is coated by the covering or overlay material such that the veneer is no longer visible. The covering forms the uppermost layer of the product. In the above description, the different types of product have been described with reference to floorings. However, the same material and problems applies for other types of building panels such as wall panels, ceiling panels, and for furniture components.

It has been found that manufacture of building panels, in particular building panels comprising wood veneer, is associated with a number of problems. For example, the moisture content of the product may cause blisters for instance when the pressure decreases. In a continuous press, maintaining a sufficient applied pressure against the product may pose a challenge.

As will become apparent herein, some problems faced in the prior art may be exacerbated in continuous manufacture of building panels comprising a sub-layer comprising powder and/or a granulate and/or a wood veneer layer.

As will become apparent herein, some problems faced in the prior art may be exacerbated in continuous manufacture of building panels comprising a wood veneer layer, typically arranged on the sub-layer.

Embodiments of the present disclosure address a need to provide methods facilitating improvements in the manufacture of building panels and improvements in the quality of building panels.

Embodiments of the present disclosure address a need to provide devices facilitating improvements in the manufacture of building panels and improvements in the quality of building panels.

SUMMARY

It is a general objective of the present disclosure to facilitate improved quality of building panels.

It is a further object facilitate improved economy of building panels.

It is a still further object to facilitate mitigate or at least lessen the problem of blisters in building panels.

It is a further object to facilitate a more even pressure gradient in continuous production of building panels.

It is also an object to facilitate a more even temperature gradient in continuous production of building panels.

It is an object to facilitate improved sealing systems in a continuous press arrangement.

It is an object to facilitate controlled deairing of a product intended to be pressed, in particular a sub-layer comprising a powder or granulate, such as wetted and optionally dried powder.

The continuous press arrangement according to aspects of the disclosure may adopt isochoric and/or isobaric principles in the operation thereof.

An isobaric system or process is characterized by constant pressure. For example, the pressure in the pressure zone facilitated by the pressure cushion may for example be facilitated by means pressurized fluid, such as pressurized air and/or pressurized oil. Thereby, an isobaric process may be facilitated.

A process may for example comprise the process of subjecting the product to heat and pressure while the product is fed through the continuous press arrangement, such as through product path, whereby the product is acted on by the pressure in the pressure zone, via the press belt. In another example, a fluid pressure acts on the one or more pressure bars, which are urged towards the press belt and the product path with a provided pressure, whereby an isobaric process may be facilitated. The press bars may be set to a fixed distance, thereby a portion of the product path and/or the product in the product path may have a constant volume.

An isochoric system or process is characterized by constant volume. For example, mechanical pressure may, via the press belt, be transferred from the press table to the product by means of one or more pressure bars each provided at a respective fixed distance from the press belt. Thereby, an isochoric process may be obtained.

The continuous press arrangement may adopt isochoric and/or isobaric principles in it's operation, as will be explained herein.

Accordingly, embodiments of the present invention preferably seek to mitigate, alleviate or eliminate one or more deficiencies, disadvantages or issues in the art, such as the above-identified, singly or in any combination by providing a continuous press arrangement 80 for manufacture of building panels, such as floor or wall panels. The arrangement comprising an upper rotatable inlet drum connecting to an upper rotatable outlet drum via an upper continuous press belt and a lower rotatable inlet drum connecting to a lower rotatable outlet drum via a lower continuous press belt. The upper and lower press belts configured to form a product path there between for feeding a product in a feeding direction in response to rotation of one or more of said drums or displacement of said press belt(-s); an upper and a lower press table, each comprising at least one displaceable pressure cushion configured to be displaced into sealing abutment with the press belt for facilitating a pressure zone. The pressure zone preferably being in shape of a pressurizable volume extending along at least a portion of the path.

The arrangement preferably comprises one or more pressure bars disposed upstream and/or downstream the pressure cushion, in the feeding direction FD. The one or more pressure bars are configured to apply a pressure to the upper press belt and/or the lower press belt respectively in a direction towards the product path.

A further object of embodiments of the invention is to provide a method for continuous manufacture of building panels, such as floor panels or wall panels.

A still further object of embodiments of the invention is to provide a method for pre-heating a product in continuous manufacture of building panels.

Another object of embodiments of the invention is to provide a method for pre-compressing a product in continuous manufacture of building panels.

An object of embodiments of the invention is to provide a method for controlling deairing of a product in continuous manufacture of building panels.

At least some of these and other objects and advantages that will be apparent from the description have been achieved by a method of manufacture of building panels, such as floor or wall panels, by means of a continuous press arrangement having an upper rotatable inlet drum connected to an upper rotatable outlet drum via an upper continuous press belt and a lower rotatable inlet drum connected with a lower rotatable outlet drum via a lower continuous press belt. The upper and lower press belts configured to form a product path there between for feeding a product in a feeding direction in response to rotation of said drums; an upper and a lower press table each comprising a displaceable pressure cushion configured to facilitate a pressure zone extending along at least a portion of said path 6. The method comprising providing one or more pressure bars at one or more positions upstream said pressure cushion and downstream inlet drums of said press arrangement, in the feeding direction, and configuring said pressure bars to successively pre-compress said product along the feeding direction to thereby reduce a thickness thereof.

In any aspects of the disclosure or combinations thereof, one or more of the pressure bars may comprise at least one circular cross-section, for example the pressure bar may be provided in the shape of a cylinder, such as a rotatable cylinder.

In any aspects of the disclosure or combinations thereof, one or more of the pressure bars may comprise at least one rectangular cross-section, for example the pressure bar may be provided in the shape of a rectangular non-rotatable bar.

In any aspects of the disclosure or combinations thereof, one or more of the pressure bars may comprise at least one rectangular cross-section, at least one circular cross-section, or combinations thereof. For example one or more pressure bar may be provided in the shape of a rectangular non-rotatable bar and one or more pressure bar in the shape of a cylinder.

Alternatively or additionally, the press belt may be heated by induction heating. Induction devices may be arranged along the press belt and configured to heat the press belt.

Induction heating can be used as the only heat source, however also in combination with heated drums, hot air or oil.

Advantages of induction heating may include that heating time of the press belt may be reduced, the temperature of the press belt may be varied at a higher rate, such as faster. Induction devices may be provided outside, such as upstream or downstream, or inside the pressure cushion.

A baseline temperature of the press belt may be facilitated by hot air and/or hot oil, such as in the drums, and induction heating of the press belt may provide additional or complementing heat.

The continuous press arrangement may compress the product or reduce the thickness of the product by at least 10%, preferably at least 15% more preferably at least 20%.

In a preferred embodiment, the one or more pressure bars and the one or more pressure cushion may aggregated compress the product or reduce the thickness of the product by up to 20%, such as up to 15% or up to 10%.

In particular, the one or more pressure bars and the one or more pressure cushion may successively reduce the thickness to an aggregated reduction in thickness of the product by at least 10%, preferably at least 15% more preferably at least 20%.

In a preferred embodiment, the one or more pressure bars and the one or more pressure cushion may be configured to obtain an aggregated compression of the product or reduction in the thickness of the product by up to 1 mm, preferably 1.5 mm more preferably at least 2 mm.

In particular, the one or more pressure bars and the one or more pressure cushion may successively reduce the thickness to obtain an aggregated reduction in thickness of the product by at least 1 mm, preferably up to 1.5 mm, more preferably at least 2 mm.

A single pressure bar may be configured to reduce the thickness of the product by at least 10% and/or at least 1 mm.

In any aspects of the disclosure or combinations thereof, the continuous press arrangement may be a continuous press arrangement for continuous pressing or manufacture of a product comprising at least one veneer layer, such as wood veneer. The at least one veneer layer may be a top surface layer and/or a back-surface layer of the panel.

In any aspects of the disclosure or combinations thereof, the continuous press arrangement may comprise one or more pressure cushions, such as two, three, four or five pressure cushions. The pressure cushions may each facilitate a pressure zone, as explained herein. The one or more pressure zones may each be configured to provide different pressures, such as successively increasing pressures.

The press belt will displace vertically due to thickness variations in the product. The thickness of the product may vary in the longitudinal extend and in the transverse extent. The thickness variations may be due to, not limited to, a varying thickness of the core, uneven distribution of adhesive, such as adhesive provided in powder form, such as by means of scattering, or the veneer may comprise a varying thickness, such as due to holes or cracks in the veneer.

A veneer may also typically comprise portions of wood having different hardness, i.e. different susceptibility to compression, thereby some portions of the veneer may more easily be compressed than other portions of the veneer. For example, a hard portion of a veneer with is relatively less susceptible to become compresses may cause the pressure cushion to displace vertically.

The press belt may also be displaced due to a gap between individual products being fed through the product path, since the pressure from the pressure bar or pressure cushion acting on the opposite side of the press belt may cause the press belt to bend slightly into the gap.

A consequence of the vertical motion of the press belt caused by product being fed between the press belts, translates into movement of the pressure cushion, when the pressure cushion is in abutment with the press belt. Thus, the pressure cushion may pitch and/or roll in response to product being fed through the product path.

Additionally, a veneer, such as a veneer arranged as a surface layer of the product, may be positioned with at least one of it's edges, horizontally displaced inside, i.e. closer to a center of the core, in relation to the edge of the core, i.e. an edges of the veneer may not be aligned with the edges of the core. Consequently, the thickness of the product may vary also due to one or more edges of the veneer, such as short edges extending transverse the feeding direction, not being aligned or flush with a corresponding edge, such as edges extending transverse the feeding direction, of the core.

Thus, the product may have a varying thickness both in the longitudinal direction and in the transverse direction.

When different portions of the pressure cushion displace or move as explained above, the pressure cushion may pitch and/or roll. The greatest vertical displacement of the pressure cushion may occur along the edges of the pressure cushion, typically along the most upstream edge portions of the pressure cushion, in particular the corner sections of the pressure cushion, since these portions of the pressure cushion will move in response to the incoming product, where the variations in thickness are typically greatest.

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which.

DETAILED DESCRIPTION OF EMBODIMENTS

Figure 1:
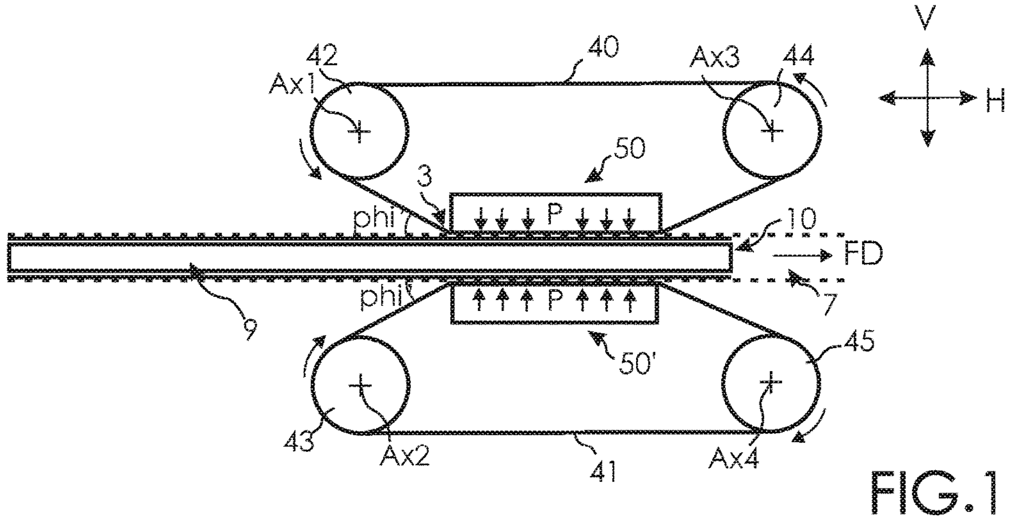
FIG. 1 shows a continuous press principle

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Referring to FIG. 1, the continuous press arrangement may comprise an upper inlet drum 42 in driving connection with an upper outlet drum 44 via an upper continuous press belt 40 and a lower inlet drum 43 in driving connection with a lower outlet drum 45 via a lower continuous press belt 41. The upper and lower press belts are configured to form a product path 6 there between. The press belts are configured to convey a product 9 along the product path 6 in a feeding direction FD. A pressure arrangement 50 may comprise a press table 51 (see e.g FIG. 5A-5D, FIG. 7, FIG. 10) comprising one or more pressure cushion 55 configured to provide a pressure zone 70 which may extend along at least a portion of the path in the feeding direction FD between the press belts 40, 41, preferably at least half the length of the press table 51 in the feeding direction. The pressure zone 70 may be a three-dimensional space. The pressure zone(-s) 70 may be formed between the upper- and lower pressure cushions and the upper and lower press belts respectively.

The pressure zone 70, 70' may be a pressurizable space. The pressure zone 70, 70' may be delimited in horizontal directions, such as in the feeding direction FD and transverse the feeding direction FD, by the pressure cushion 55, 55'. The pressure zone 70, 70' may be delimited in a first vertical direction by the press table 51. The pressure zone 70, 70' may be delimited in a second vertical direction by the press belt 40, such as downwards in the case of the upper part of the continuous press arrangement. The second vertical V direction may be opposite the first vertical direction. This is shown for instance in FIGS. 10-12.

Hence, a pressure zone 70, may be formed within the boundaries pressure cushion 55.

The pressure cushion 55 may seal the pressure zone 70 against the ambient pressure Pa.

Pressure cushion may preferably be displaceable in relation to the press table, such as in a vertical direction.

Figure 8:
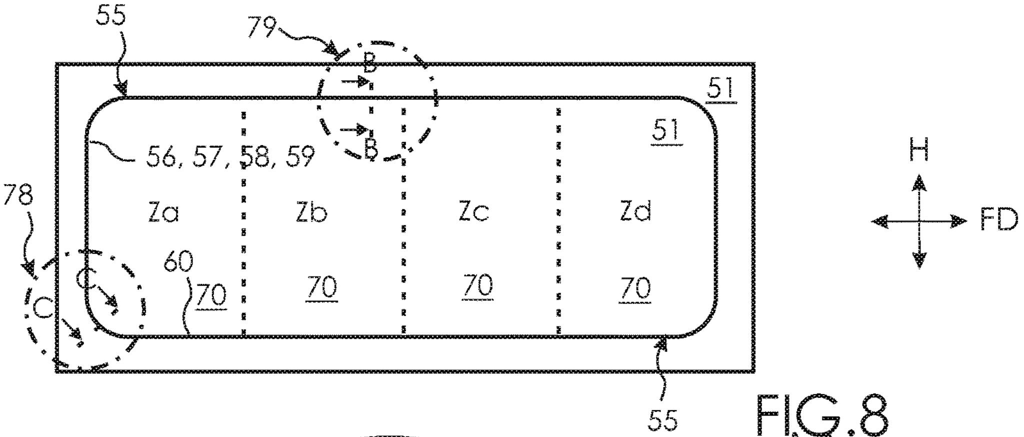
FIG. 8 is a schematic cross view of details of the embodiment of FIG. 7.
Figure 16A:
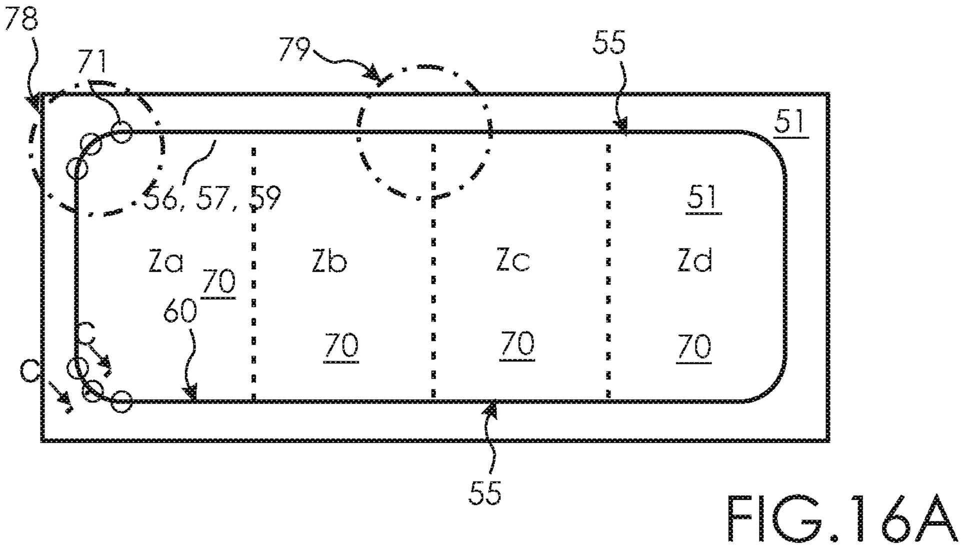
FIG. 16A is a schematic illustration of details of a press table and pressure cushion according to embodiments.

To facilitate displacement of the pressure cushion 55, the press table 51 may comprise a displacement groove 60 configured to at least partially receive the pressure cushion 55. The displacement groove 60 may extend continuously, such as in a loop, in the press table 51, as shown in FIGS. 8 and 16A. The displacement groove 60 may comprise a substantially rectangular shape in a horizontal H plane. The displacement groove 60 may comprise a substantially rectangular cross-section in a vertical V plane.

Figure 9A:
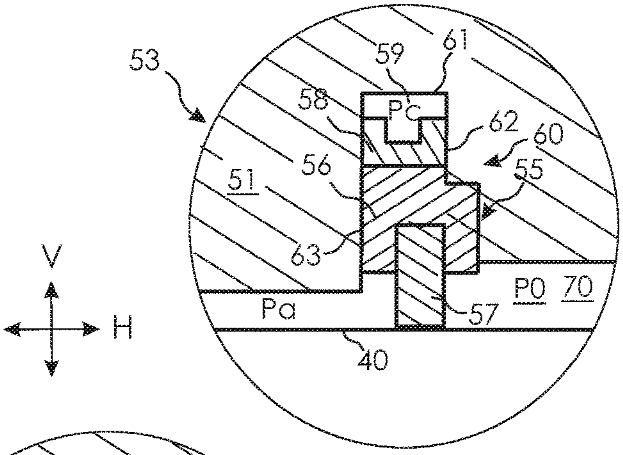
FIG. 9A shows details of the embodiment of FIG. 7.
Figure 9C:
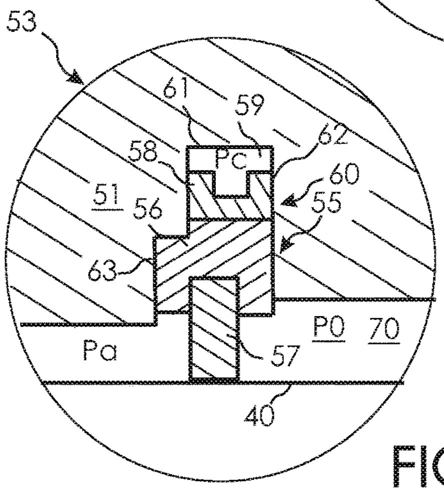
FIG. 9C is another alternative implementation form the embodiment of FIG. 8.
Figure 9B:
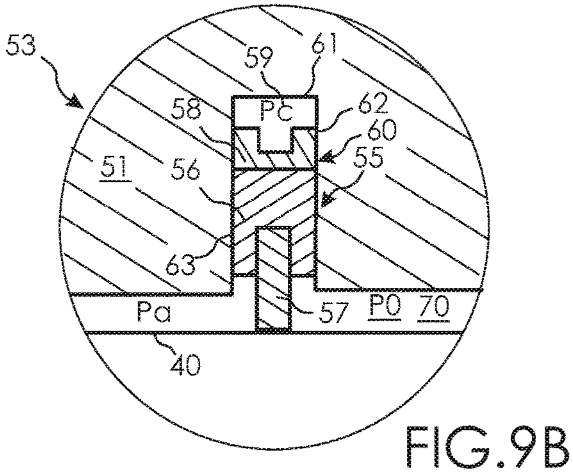
FIG. 9B is an alternative implementation form the embodiment of FIG. 8.

In one embodiment, illustrated in FIGS. 9A-9B, the pressure cushion 55 may comprise a seal frame 56 and/or a friction seal element 57 attached to the seal frame to displace therewith. The seal frame 56 may displace at least partially in the press table 51.

The friction seal element 57 may comprise a plurality of individual friction seal elements extending contiguously.

The friction seal element 57 may comprise a plurality of individual friction seal elements extending contiguously and configured to extend continuously along the displacement groove 60.

Figure 10:
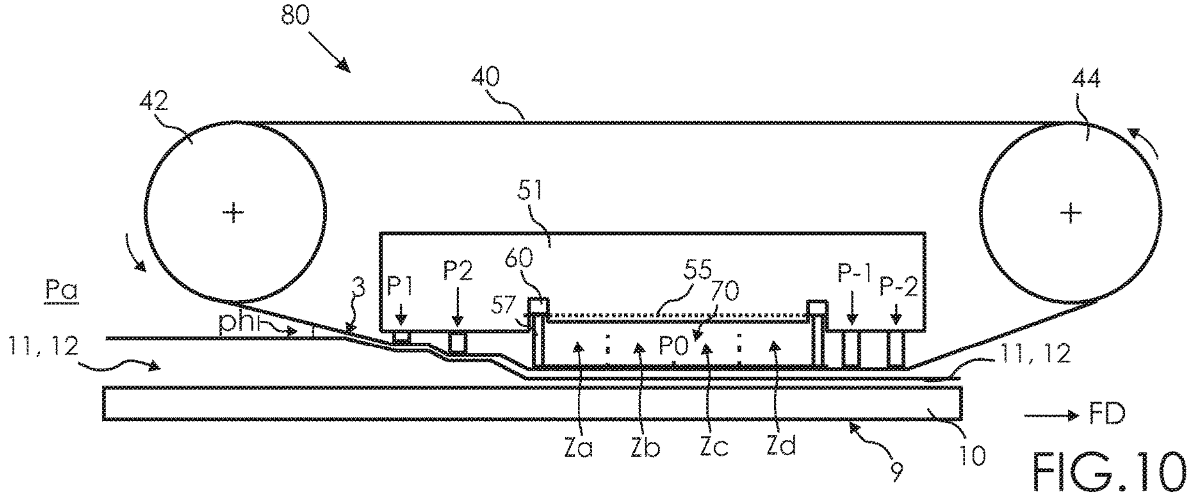
FIG. 10 shows a continuous press arrangement according an embodiment of the present disclosure.

As derivable from FIG. 10, the at least one pressure bar P1, P2 may be provided in the press table 51 at a position(-s) upstream the pressure cushion 55 in the feeding direction FD, such as upstream the entire pressure cushion 55, such as upstream the seal frame 56, such as upstream the entire seal frame 56, such as upstream the friction seal member 57, such as upstream the entire friction seal member 57.

As derivable from FIG. 10, the at least one pressure bar P-1, P-2 may be provided in the press table 51 at a position (-s) downstream the pressure cushion 55 in the feeding direction FD, such as downstream the entire pressure cushion 55, such as downstream the seal frame 56, such as downstream the entire seal frame 56, such as downstream the friction seal member 57, such as downstream the entire friction seal member 57.

The upper press table may be adjustable in a vertical direction to thereby be adapted to the product intended to be fed through the product path 6. The upper and lower press tables 51 may be stationary during operation of the press arrangement. The drums 42, 44, 43, 45 may be stationary during operation. The upper press belt 40 forms an angle phi' with the plane of the product path 6 or a front surface of the product and correspondingly, the lower press belt may form an angle phi' with a plane H of the product path or the front surface 5 and/or back surface 6 of the product 9 such that there is play between the inlet drums and the product. Typically, a first position of contact 3' between the product and the press belt may be in close proximity of a most upstream edge of the press table, in respect of the feeding direction. According to aspects of the disclosure, the product may be pre-heated by thermal radiation from the press belt prior it is feed between the press tables. The According to aspects of the disclosure, the product may be pre-heated by means of abutment with the press belt prior being fed between the press tables. According to aspects of the disclosure, the pre-heating of the product may be adjusted by adjusting the distance between the upper inlet drum and the lower inlet drum, to thereby adjust the angle phi. For example, referring to FIG. 6, by reducing the distance between the upper- and lower inlet drums, the angle phi will be reduced, whereby the upper and lower press belts are brought into closer proximity of the product path and/or product. Also, the first position of contact 3' may be moved upstream in the feeding direction FD. Thereby, increased pre-heating is achieved. Thereby, the continuous press may be made smaller and thus more economic.

The product 9 may comprise a binder which may be provided in the shape of a powder. The powder typically comprises a fraction of air, which is expelled on the sides of the product when pressure is applied by the pressure cushion. The expelling of air may alter the properties of or distort the powder layer or displace a portion of the powder thereof and may thus have negative effects for instance on the quality and/or the appearance of the product. For example, should the powder layer e.g. comprise a printed pattern.

To summarize, heat is applied mainly by the heated press belt. The press belt may be heated by heating the drums, however the press belt may additionally or alternatively be heated by hot air or hot oil in the pressure zone and/or in the drums.

To summarize, a product is fed through the continuous press arrangement having a play in relation to the inlet and outlet drums respectively. Heat is conducted to the product from the press belt at least as from a point of first contact between the press belt and the product. The product may however in addition be pre-heated by the press belt prior contact therewith, as will be explained herein.

Alternatively or additionally, the press belt may be heated by induction heating. Induction devices may be arranged along the press belt and configured to heat the press belt.

Induction heating can be used as the only heat source, however also in combination with heated drums, hot air or oil. Thus, induction heating, alone or in combination with any of the aspects of the disclosure.

A pressure is applied by the pressure cushion downstream the inlet drums, and said pressure may be relieved as the product is fed past the pressure cushion.

Thereby, the pressure applied to the product over the press arrangement 80 may form a pressure curve, such as pressure as a function of time or distance. As explained herein, embodiments of the aspects of the present disclosure may facilitate that the pressure curve is rendered more even or more isobaric, such as decreasing the rate of pressure change upstream and/or downstream the pressure zone.

Thereby, the temperature of the product, such as the surface temperature at the front surface 5 or back surface 6 or the core 10 or the temperature of the binder, over the press arrangement 80 forms a temperature curve, such as temperature as a function of time or distance. As explained herein, embodiments of the aspects of the present disclosure may facilitate that the temperature curve is rendered more even, such as decreasing the rate of temperature change upstream and/or downstream the pressure zone.

Figure 2:
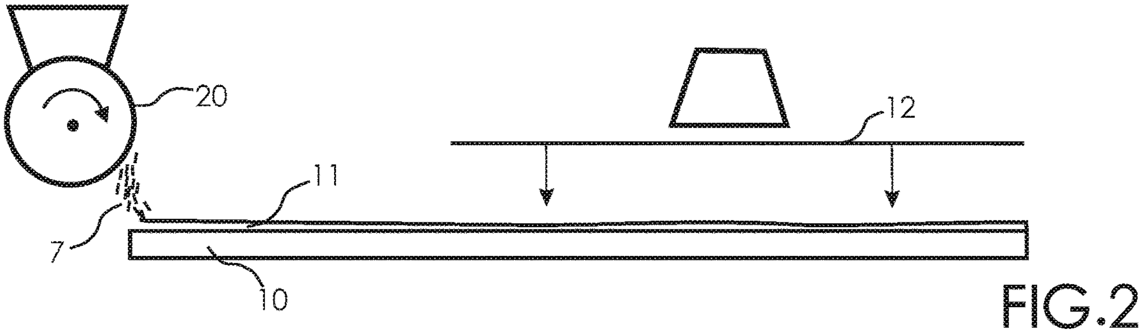
FIG. 2 shows an exemplary process for producing a product according to an embodiment of the disclosure.

FIG. 2 illustrates an exemplary composition of layers of a product 9 intended to be pressed. The product may comprise one or more layers. In one embodiment the product comprises a first layer 11 is typically provided to a board 10, which may be a wood-based board, such as HDF, MDF or like as discussed above. The first layer in shape of a sub-layer 11 may comprise a powder, such as a dry powder or a granulate, such as wetted dried powder. It should be appreciated that the term powder layer may in the following text include the variant granulate layer. A second layer in shape of a surface layer 12 may be provided to the product, interspacing the first layer between the second layer and the board. The second layer may for example comprise a printed pattern, paper, wood veneer or combinations thereof.

Figure 3:
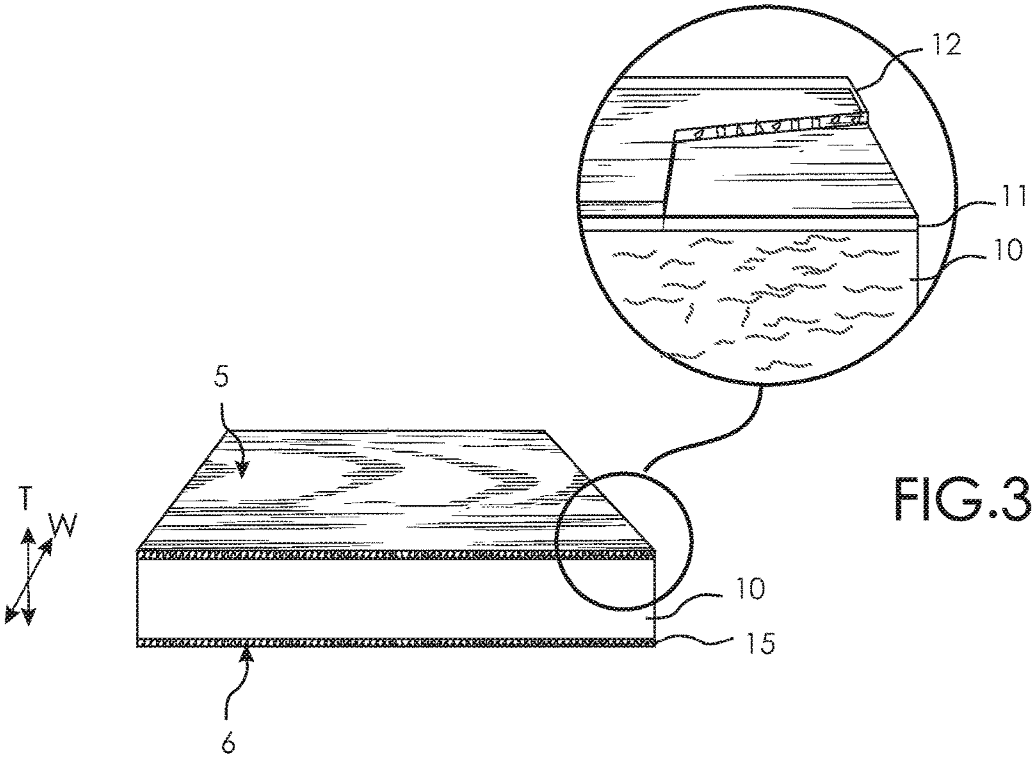
FIG. 3 shows in a perspective-view of a building panel according to an embodiment of the disclosure.

Now referring to FIG. 3 showing an exemplary building panel comprising the board 10, a sub-layer 11 in the shape of a powder layer, and a surface layer 12 in the shape of a veneer.

Figure 4:
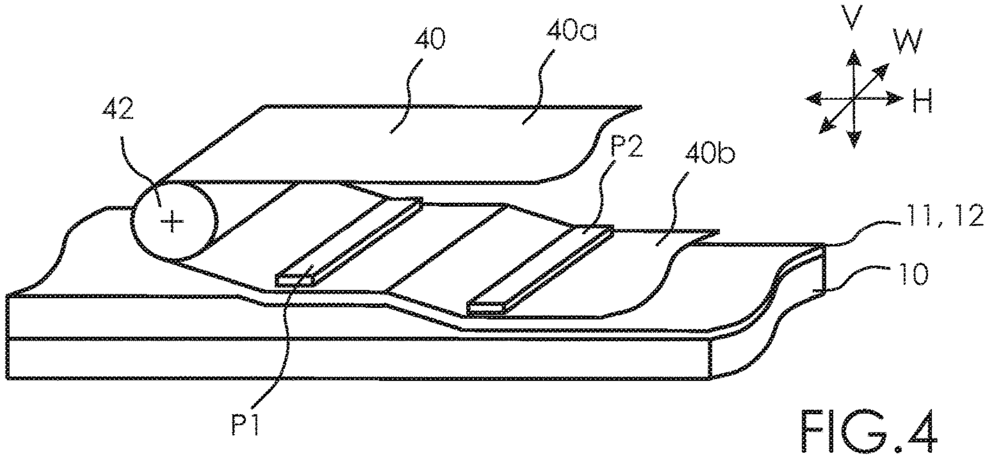
FIG. 4 shows details of an embodiment of the disclosure.

A schematic illustration of details of an embodiment of a first aspect invention is shown in FIG. 4 showing an inlet drum 40, 43 in driving connection with a press belt 40, 41. The press belt has an internal surface 40*b*, 41*b* and an external surface 40*a*, 41*b* facing the product 9. One or more pressure bars P1, P2, which are configured to slidingly abut the internal surface 40*b*, 41*b* to thereby pre-compress the product 9 upstream the pressure zone. More than one pressure bar may be utilized in order to successively pre-compress the product in a stepwise manner.

Figure 5A:
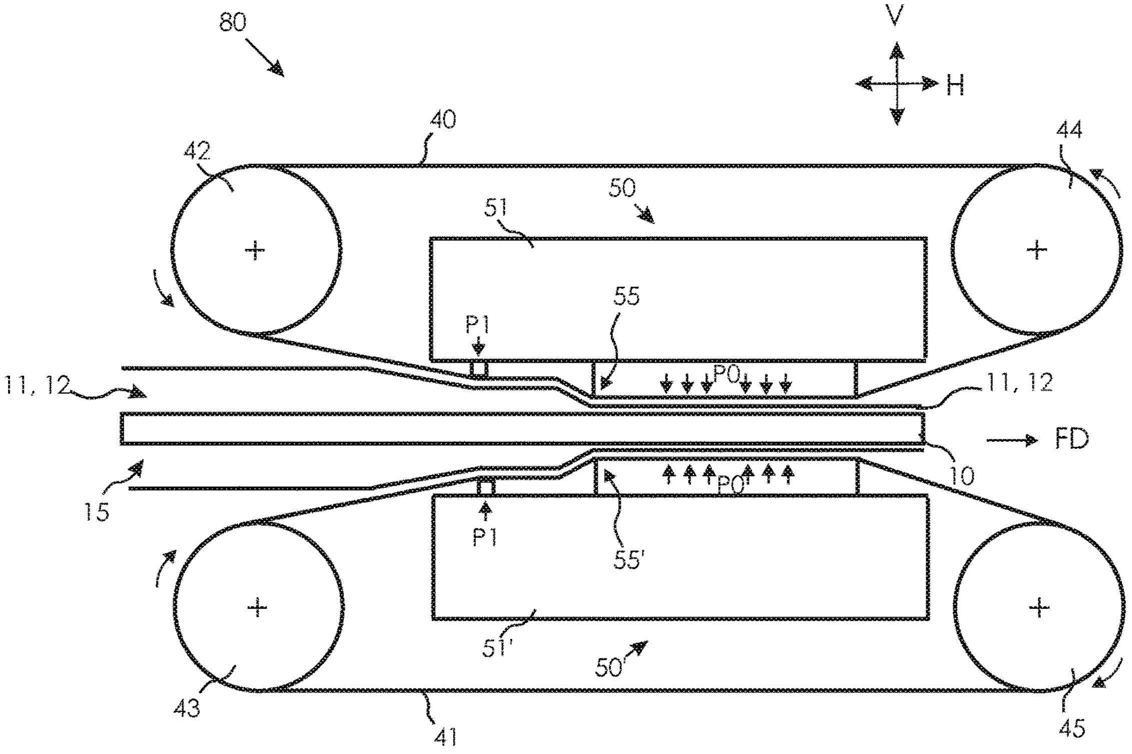
FIG. 5A-D show schematic illustrations of a continuous press arrangement according to embodiments of the disclosure.
Figure 5B:
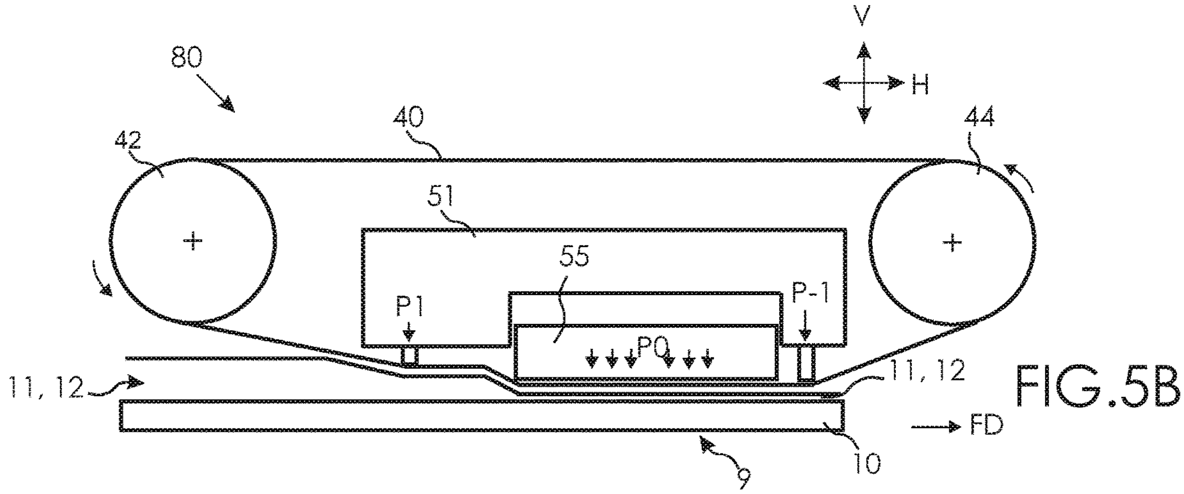
Figure 5C:
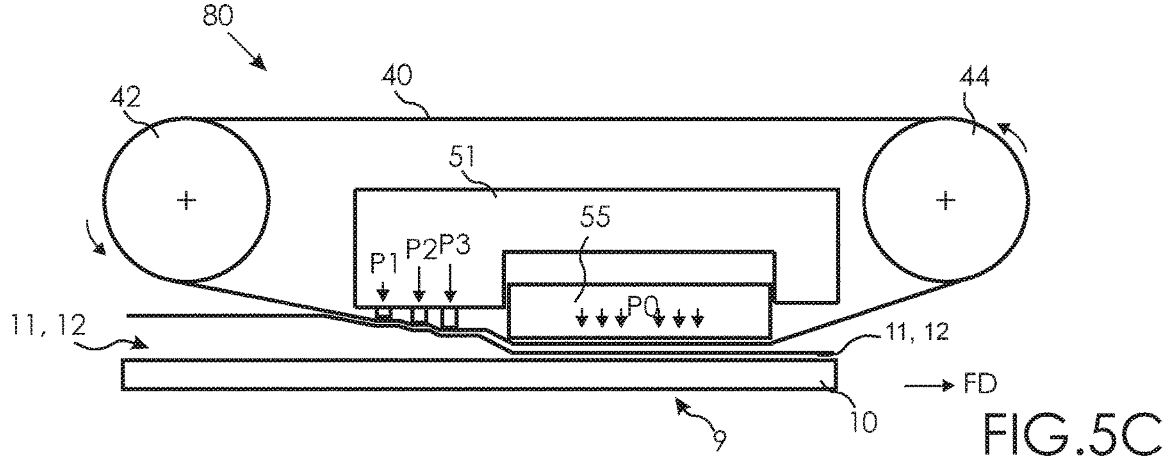
Figure 5D:
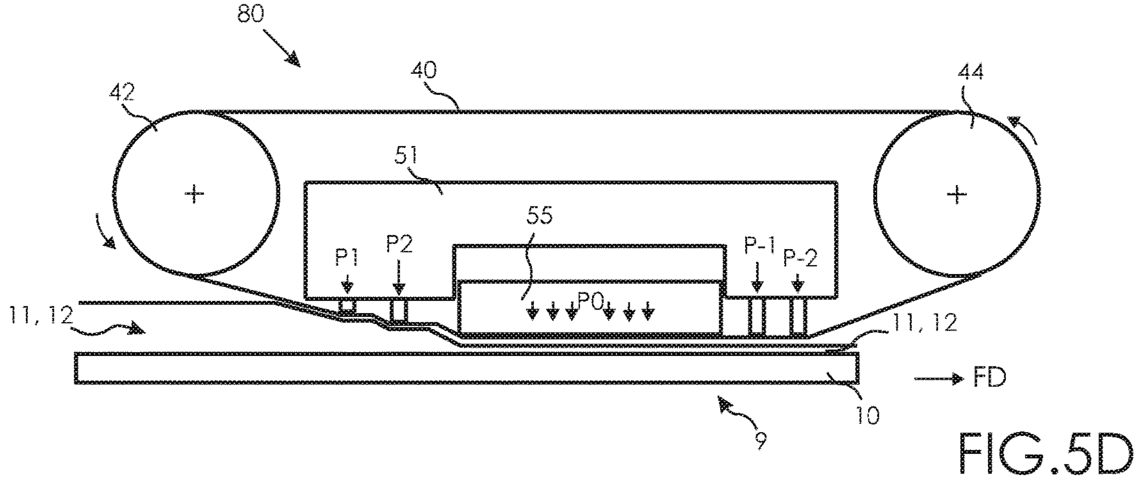
Figure 6:
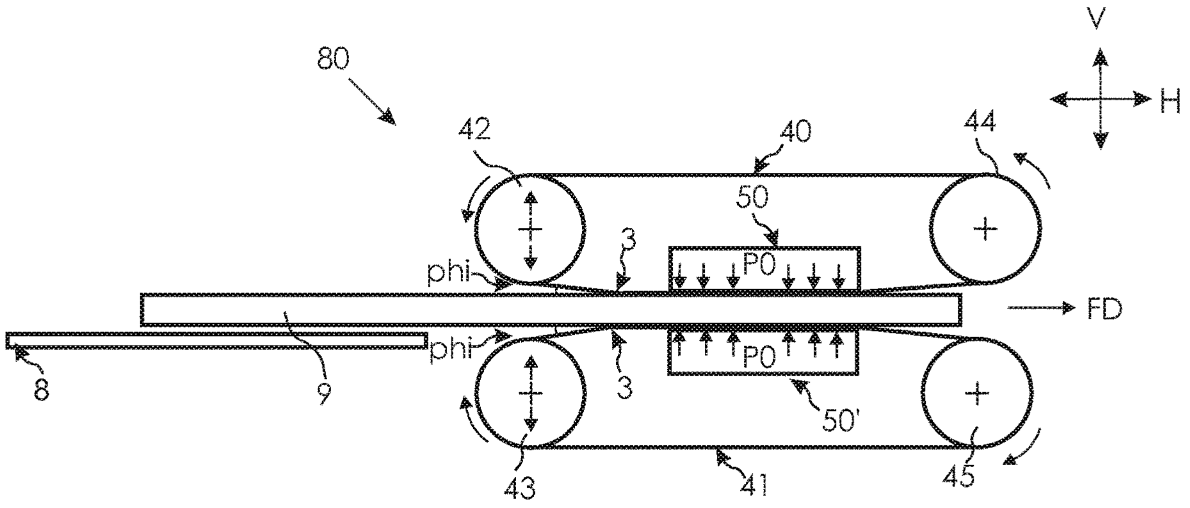
FIG. 6 shows a schematic illustration of a continuous press arrangement according to an embodiment of the disclosure.

Although FIGS. 4, 5A-D, 7 and 10 only show upper halves of respective press arrangements, i.a. one set of inlet and outlet drums with adjoining press belt and press table 51, for the purpose of explaining aspects of the disclosure, it is apparent to the person skilled in the art that the corresponding arrangements as illustrated in FIGS. 4, 5A-D and 7 may preferably be applied also on an opposite side of the product path, as shown e.g. in FIGS. 1 and 6. It should however be appreciated that the aspects herein may be advantageous when implemented in a single belt continuous press or a double belt continuous press.

As illustrated in FIG. 5A-D, a product may be fed in the feeding direction FD by means of the press belt, whereby it is subjected to pressure in the pressure zone 70 facilitated by the pressure cushion 51. Due to heat transfer from the press belt to the product, the binder becomes liquid and may thereby be referred to as active. An area of the pressure cushion underneath which the binder is active be referred to as active area. Once the binder is active, intermolecular cross-linking occurs at a relatively high rate, whereby the binder cures. In order to obtain a stable curing process, it may be desirable to obtain a curing rate of preferably 95% while the product is still in the active area. It follows that a sufficient amount of heat must be transferred to the product in order to render the binder active in order to achieve a high curing rate while the product is under pressure. However, excess heat may raise the steam pressure of the moisture contained in the product to the extent that it may have undesirable effects on the product and/or the manufacturing process. For example, if the steam pressure is too high when the product leaves the pressure zone and the pressure is thus decreased, the steam may cause blisters in the surface of the resulting building panel. Also, excessive heat may heat up a core of the product to such extent that the core may prevent the front layer and back layer from cooling off, as heat is then conducted from the inside of the product to the outside. This phenomenon may cause issues for instance in the further processing of the building panel, such as in subsequent manufacturing steps comprising forming of locking systems along the edges of the building panel.

As mentioned, one or more of the drums may heat the press belt, e.g. by heat transfer where the press belt contacts the drums. This may be facilitated for example by means of one or more of the drums containing hot oil.

The continuous press arrangement may compress the product or reduce the thickness of the product by up to 20%, such as up to 15% or up to 10%.

In a preferred embodiment, the one or more pressure bars and the one or more pressure cushion may aggregated compress the product or reduce the thickness of the product by up to 20%, such as up to 15% or up to 10%.

In particular, the one or more pressure bars and the one or more pressure cushion may successively reduce the thickness to an aggregated reduction in thickness of the product by at least 10%, preferably at least 15%, more preferably at least 20%.

In a preferred embodiment, the one or more pressure bars and the one or more pressure cushion may be configured to obtain an aggregated compression of the product or reduction in the thickness of the product by up to 1 mm, preferably 1.5 mm more preferably at least 2 mm.

In particular, the one or more pressure bars and the one or more pressure cushion may successively reduce the thickness to obtain an aggregated reduction in thickness of the product by at least 1 mm, preferably up to 1.5 mm, more preferably at least 2 mm.

In any aspects of the disclosure or combinations thereof, one or more of the pressure bars may comprise at least one circular cross-section, for example the pressure bar may be provided in the shape of a cylinder, such as a rotatable cylinder. An exemplary embodiment comprising a pressure bar having at least one circular cross-section is shown for instance in FIG. 4, FIG. 10 and FIGS. 5A-5D.

In any aspects of the disclosure or combinations thereof, one or more of the pressure bars P1, P-1 may comprise at least one rectangular cross-section, for example the pressure bar may be provided in the shape of a rectangular non-rotatable bar.

Figure 12:
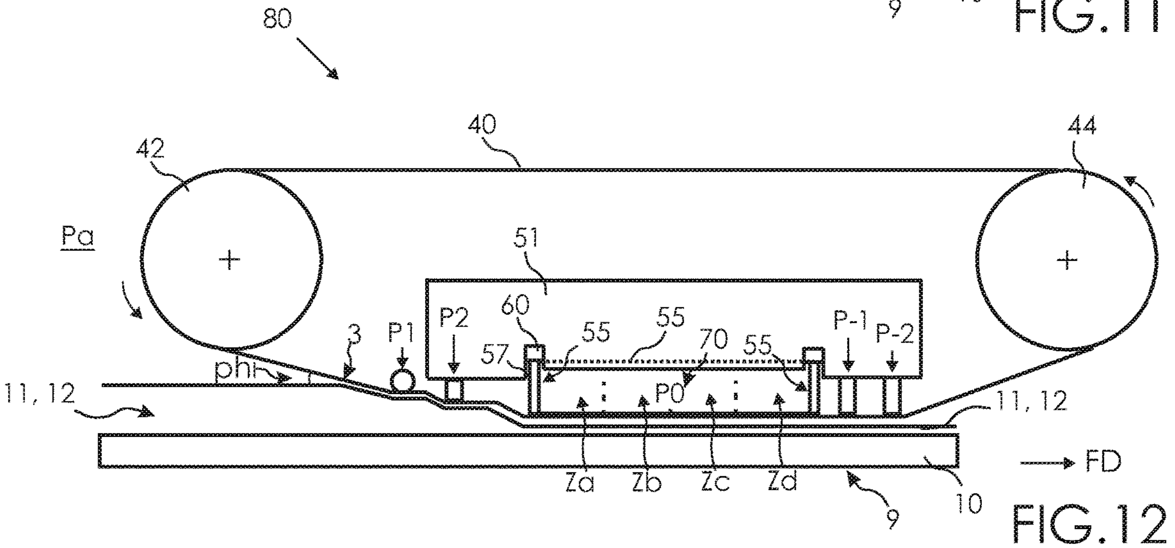
FIG. 12 shows a continuous press arrangement comprising a rotatable pressure bar according an embodiment of the present disclosure.
Figure 13:
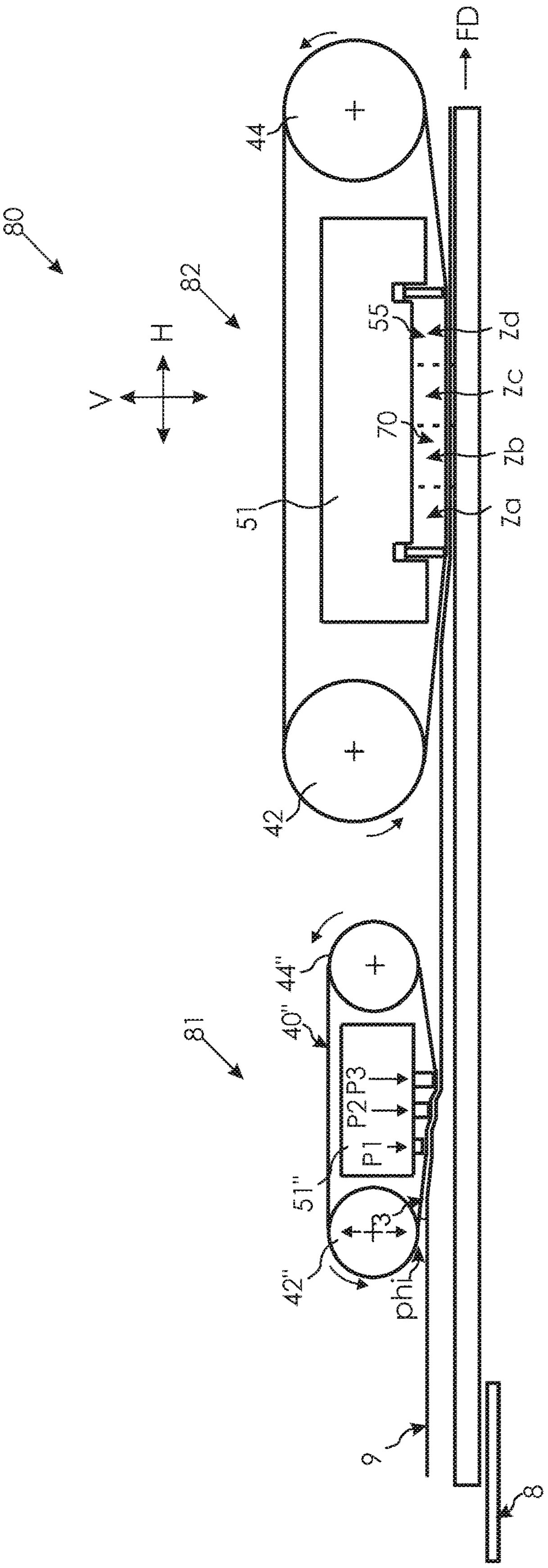
FIG. 13 shows a continuous press arrangement according to a further embodiment of the disclosure.

In any aspects of the disclosure or combinations thereof, one or more of the pressure bars P1, P-1 may comprise at least one rectangular cross-section, at least one circular cross-section, or combinations thereof. For example one or more pressure bar may be provided in the shape of a rectangular non-rotatable bar and one or more pressure bar in the shape of a cylinder, such as a rotatable cylinder or pressure roller. An exemplary embodiment of a pressure bar P1 in shape of a rotatable cylinder is shown in FIG. 12.

The feeding velocity of the product 9 through the press arrangement 80 may typically be about 8-10 meters per minute.

The temperature of one or more of the inlet drums 42, 43 may be configured to heat the press belt and may typically be about 190-210 degrees Celsius. Thereby, the press belt 40, 41 may have a temperature of about 190 to 210 deg. C. as the press belt roll off the drum, such as the inlet drum. As mentioned, heat may correspondingly be transferred to the press belt 40, 41 via contact with the outlet drums 44, 45.

The press belt may have a temperature T1 as it roll off the inlet drum 42 and an exit temperature T2 as it rolls onto the outlet drum 44. T1 may be in the range of 190-210 deg. C. and T2 may be in the range of 180 deg. C.

The pressure cushion 55 may be configured with one or more temperature zones such as a first Za, second Zb third Zc and fourth Zd temperature zone, as illustrated in FIG. 8 and FIGS. 10 to 12. Other configurations are conceivable such as one, two, three, four, five or six temperature zones. The temperature zones may be configured to facilitate individual heating of the respective temperature zones, for example active heating or active cooling along the pressure cushion in the feeding direction. The temperature in a respective temperature zone may be controlled e.g. by controlling the temperature of a circulating air flow, for example by means of a turbo fan.

As will become apparent herein, aspects of the disclosure may facilitate that the rate of change of pressure increase and/or pressure decrease is reduced.

Thereby a more even pressure curve is obtained over the continuous press arrangement 80.

As mentioned, it may generally be desirable to utilize the length of the pressure zone 70, in the feeding direction FD, to obtain a stable curing process and thus a stable final product, such as a building panel. A stable curing process may have been considered obtained when a certain degree of curing, such as 95% is reached by the time the product exits the pressure zone. The rate of heat transfer from the pressure belt 40, 41 to the product 9 may increase once the binder of the sub-layer 11 becomes liquid, therefore, it may be desirable to reach the point in the process where the binder becomes liquid early on in the pressure zone 70 since the distance or area of the pressure zone in the feeding direction FD which is being occupied for heating the product 9 to the point where the binder becomes liquid (approximately 90 deg. C.) mat thus not be "actively" used. This may be negative for the economy of space in the press and thus for the economy of production and thus the economy of the building panel. Accordingly, it may be desirable to utilize as great area as possible of the pressure zone 70, remembering that the pressure zone 70 extends over an area of the press belt 40, 41, for the curing process. During the curing of the product, i.a. the binder, it may be desirable to have the product under pressure, i.a. in the pressure zone. The product 9 may also typically cool off somewhat as it propagates through the pressure zone. For reasons already mentioned, it may be desirable to achieve that the product has cooled off sufficiently by the time it exits the pressure zone in order for the steam pressure to be low enough not to cause blisters. This may be further reason to reach the point where the binder becomes active at an early point along the product path. As will be explained herein, aspects of the present disclosure may facilitate that the pressure applied to the product may be gradually decreased, such as stepwise decreased, simultaneously as the product cools off between the pressure zone 70 and the outlet drums 44, 45. Thereby, the conditions resulting in the formation of blisters may at least to some extent prevented.

The steam pressure exerted by the moisture content of the product, such as moisture contained in a powder or a veneer, increases with temperature. Thus, the more energy is transferred to the product, the higher steam pressure.

The press belt 40, 41 may preferably have a temperature sufficient to cause activation of the binder within a certain distance in the feeding direction or after a certain time period of contact with the product, or a combination thereof. Once the binder is in liquid state, curing process is drastically accelerated and the rate of the curing process is increased. It should be mentioned that a certain degree of curing of the binder may occur also in non-liquid state, however this relatively slow curing process may be neglectable in relation to the rate of curing herein referred to as curing or in active state. The rate of the cross-linking i.e. curing, may depend on temperature, thus, a certain temperature of the product during curing may be optimal in order to obtain a stable curing of the product. It follows that a greater transfer of energy from the press belt to the product may advance the start of the curing process upstream in the feeding direction, i.e. may activate the binder at an earlier position. Should, however the temperature of the binder be too high, the rate of the cross-linking reaction may become too high and the binder may not cure in a stable manner. This may result in inferior quality of the finished product.

In any aspect, the binder may be provided in powder form.

As discussed, it may be preferable also to consider that the temperature of the core 10 of the product 9, which may comprise a board, may preferably not reach too high temperatures at the outlet drums 44, 45. This is because if the temperature of the core 10 is too high, energy will be conducted from the core 10 to the surface layer 12 once the surface starts to cool down. This may compromise further processing such as profiling, lacquer etc. and may necessitate intermediate storage of the panels prior further processing.

Cooling and/or heating of the product 9 may be controlled in several ways, some of which have been discussed above. The temperature zones may each be cooled or heated. In one embodiment, heat is added via the inlet-drums 42, 43 and preferably also the outlet-drums 44, 45. The press belt 40, 41 may be passively cooled between the inlet-drums and the outlet-drums. Heat may transfer from the belt 40, 41 to the product 9, thus the belt may be passively cooled for instance this manner. By means of passive cooling of the press belt 40, 41, the product 9 may obtain a sufficiently low temperature as it exits through the outlet drums in order not to compromise tolerances of locking systems formed along one or more edges of the finished product, such as a building panel, carried out subsequent a continuous press process described herein in a production line for manufacturing building panels.

As discussed, the product 9 may typically have a varying thickness prior it enters the pressure zone. The thickness may vary in the feeding direction FD and in a direction transverse the feeding direction, such as in the width-direction of the product.

As a result, the product 9 may cause the press belt 40, 41 and the pressure cushion 55, 55' to tilt or become inclined in the feeding direction FD and/or in a direction transverse the feeding direction FD, hence the pressure cushion 55 may pitch and/or roll.

Tilting or pitch and/or roll of the press belt 40, 41 may cause the pressure zone 70 to leak, whereby the pressure zone 70 is unable to maintain a desired working pressure P0 in the pressure zone 70, such as at least 25 bars, preferably 30-40 bar. Thus, the working pressure P0 may be applied to the respective press belts 40, 41 and thereby urge the respective press belts 40, 41 towards the product path 6 where the product 9 may be arranged, to thereby press the product 9.

As illustrated for example in FIG. 5A-D, the press arrangement 80 may comprise one or more pressure devices which may be provided in the shape of pressure bars P1, P2, P3, P4, P4.

The one or more pressure bar may be a fixed non-rotating member and/or rotatable members The pressure bar may have a length extending in a longitudinal direction thereof, corresponding to a direction transverse the feeding direction and parallel the product path, such as a horizontal direction. The pressure bar may have a height extending in a vertical direction and a width extending in the feeding direction. According to embodiments the length of the pressure bar is greater than the width, and the width may be greater than the height. The one or more pressure bars may comprise grooves distributed along the length thereof for reducing friction against the press belt.

The pressure bar may be configured to slide against the press belt while applying pressure to the press belt 40, 41 or roll against the press belt while applying pressure to the press belt 40, 41 The pressure bars may be configured to apply a pressure towards the continuous press belt, in particular an inwards-facing side of the press belt, whereby the press belt is urged, such as constantly or continuously urged, toward the product path. In FIGS. 5A-C the pressure is applied in a vertically downwards direction, however it follows that in the case of one or more corresponding pressure bars arranged also on the opposite side of the product 9, these pressure bars will urge the lower press belt upwards towards the product path.

As derivable from FIGS. 5A-B, the pressure bar P1, P-1 may be arranged on a side of the press belt which is opposite the side of the press belt facing towards the product path 6 and/or the product 9. The pressure bar may be configured to push the press belt towards the product. The pressure bar may be configured to push the press belt towards the product 9 by applying a pressure of magnitude not greater than the working pressure P0 applied by the pressure arrangement 50 i.e. in the pressure zone 70, such as 50-80%. For example, the pressure bar may apply a pressure of about 25 bar when P0 is about 30 bar.

The pressure bar P1, P-1 may be configured to push the press belt 40, 41 towards the product 9 by applying a pressure of magnitude not greater than the clamping pressure PC applied by the pressure cushion 55.

The pressure arrangement 50 may comprise the press table 51 and the pressure cushion 55.

As derivable from FIG. 10, the at least one pressure bar P1, P2 may be provided in the press table 51 at a position upstream the pressure cushion 55. In particular, the at least one pressure bar P1, P2 may be provided in the press table 51 at a position upstream the pressure cushion 55 in the feeding direction FD, preferably upstream the entire pressure cushion 55.

As derivable from FIG. 10, further pressure bars P-1, P-2 may be provided in the press table 51 at respective positions downstream the pressure cushion 55. In particular, further pressure bars P-1, P-2 may be provided in the press table 51 at respective positions downstream the pressure cushion 55 in the feeding direction FD, preferably downstream the entire pressure cushion 55.

It follows that the pressure bars may preferably be provided outside the pressure zone 70 provided within the seal frame 56 and/or the friction seal element 57 of the pressure cushion 55.

The one or more pressure bar may be configured to pre-compress the product. In particular, the pressure bar may be configured to pre-compress the powder layer of the product. Thereby, air is expelled from the powder layer, such as about 50% of the air initially contained in the powder layer may be expelled. Thus, the pressure bar may facilitate that air is expelled from one or more layers of the product. In particular, controlling deairing of the product may comprise arranging more than one pressure bar upstream the pressure cushion 55 in the feeding direction, whereby the product 9 may be progressively be deaired in a controlled stepwise manner. Further, controlling deairing of the product 9 may comprise adjusting a pressure applied to the pressure bar and/or adjusting a pressure applied by the pressure bar to the press belt.

Control pressure bar with fluid, such as air or oil, or by means of mechanical pressure, such as a mechanical device.

Thereby, the mean thickness of the product 9 may be reduced. Thereby, variations in the thickness of the product may be evened out, such as variations in the thickness in the feeding direction and/or variations in thickness in a direction transverse the feeding direction. Thereby, it may be facilitated that the pitching and/or rolling of the pressure cushion 55 may be is reduced, whereby a desired working pressure P0, such as greater than 25 bar may be facilitated. It is further facilitated that the longevity of seals 58 between the pressure cushion 55 and the press table 51, which may be in the form of gaskets, is prolonged, since the vertical distance the press belt and the pressure cushion will be displaced when receiving a product may thus be reduced.

For example, the pressure bar may pre-compress the product from about 15.2 mm to about 12.5 mm, and the pressure arrangement subsequently compress the product from about 12.5 mm to about 11.7 mm.

Curtesy of the one or more pressure bar, the press belt may be pushed to abutment with the product. Thereby, heat is more efficiently transferred from the press belt to the product. Thereby, the product 9 may be pre-heated upstream the pressure zone. Thereby, the binder may be activated, i.e. become liquid faster, i.e. earlier, i.e. at a position upstream in the feeding direction. This may facilitate more time available for the product to cure under pressure in the pressure zone, whereby an improved quality of the final product may be facilitated.

A surface layer 12 in shape of a veneer layer may to some degree isolate the binder from heat. Therefore, when applying a veneer layer to the product such that the binder is comprised in the sub-layer 11 interspaced between the core 10 and the veneer, it may have the effect that more heat is required cause the binder to become liquid. It may thus be advantageous to pre-heat the product 9.

A lower surface of one or more of the pressure bars P1, P-1, in the vertical direction V, may be configured to extend in a plane vertically below a lowermost surface of the inlet drum 42, preferably when the product 9 is fed through the press arrangement 80.

As explained in relation to the exemplary embodiments of FIGS. 4A-C, the press arrangement 50 may be provided with various configurations of pressure bars.

As mentioned, one or more pressure bars provided upstream the pressure zone 70, which may be provided by means of a pressure cushion 55, may facilitate that the pressure applied to the product 9 is gradually increased in the feeding direction. Thus, in a preferred embodiment one or more pressure bars are provided upstream the pressure cushion 55 as derivable e.g. from FIG. 10. For example, referring to FIG. 5C, a first pressure bar P1' may apply a pressure of 20 bar, a subsequent pressure bar P2 a pressure of 25 bar and a further subsequent third pressure bar P3 a pressure of 30 bar. The number of pressure bars in the press arrangement upstream the pressure zone, preferably upstream the pressure cushion, may thus be adapted to obtain a desired rate of increase in applied pressure along the feeding direction or to avoid sudden increase in pressure applied to the product, during manufacture of laminate. It generally holds that, in a sequence of pressure bars arranged upstream the pressure zone, a subsequent pressure bar may be configured to apply a pressure at least equal to, preferably greater than a pressure applied by the pressure bar preceding the subsequent pressure bar.

The corresponding principle may be applied downstream the pressure zone, as illustrated in FIG. 5C, with the object of facilitating a more even decrease in pressure or pressure relief downstream of the pressure zone, preferably downstream the pressure cushion 55. Also, as shown in FIG. 5D the feature of providing one or more pressure bars upstream the pressure zone 70, preferably upstream the pressure cushion 55, may be combined with the feature of providing one or more pressure bars downstream the pressure zone. It generally holds that, in a sequence of pressure bars arranged downstream the pressure zone, a subsequent pressure bar may be configured to apply a pressure equal to, preferably not greater than a pressure applied by the pressure bar preceding the subsequent pressure bar.

The number of pressure bars in the press arrangement downstream the pressure zone, preferably downstream the pressure cushion, may thus be adapted to obtain a desired rate of decrease in applied pressure along the feeding direction or to avoid sudden decrease in pressure applied to the product, during manufacture of laminate. This may facilitate that the product cools off gradually in the feeding direction while being under pressure by means of one or more pressure bars. Thus, the pressure applied to the product by means of the pressure bars may gradually decrease as the steam pressure of the moisture of the product also decreases during cooling of the product. For example, as shown in FIG. 5D, the pressure P0 may be 35 bar, whereby the third pressure bar P-1 applies 30 bar and the fourth pressure bar P-2 applies 25 bar. A subsequent fifth pressure bar (not shown) may apply a pressure of 20 bar. This arrangement may mitigate or at least reduce the occurrence of blisters in the product which may be caused by a too sudden decrease in applied pressure to the product, whereby steam may burst out of a layer of the product and cause blisters.

The above principle for the pressure applied by the pressure bars may be expressed as P1<P2<P3< . . . . <Pm<P0 and/or P−m . . . >P−3>P−2>P−1, where positive numbers denotes a pressure applied upstream the pressure zone 70, preferably upstream the pressure cushion 55, and negative numbers denote a pressure applied downstream the pressure zone 70, preferably upstream the pressure cushion 55, in the feeding direction. Thereby, a pressure curve may be obtained over the press arrangement 80.

For example, one or more pressure bars may apply one or more of 15, 20, 25, 30, 35 bar pressure upstream the pressure zone, preferably upstream the pressure cushion, and one or more pressure bars may apply one or more of 35, 30, 25, 20, 15 bar pressure downstream the pressure zone, preferably downstream the pressure cushion in the feeding direction FD.

The pressure bar may comprise temperature resistant material, such as a composite, for example a composite comprising carbon, such as graphite composite.

Pressure bar with grooves/recesses, not continuous contact with the press belt in a direction transverse the feeding direction.

Figure 7:
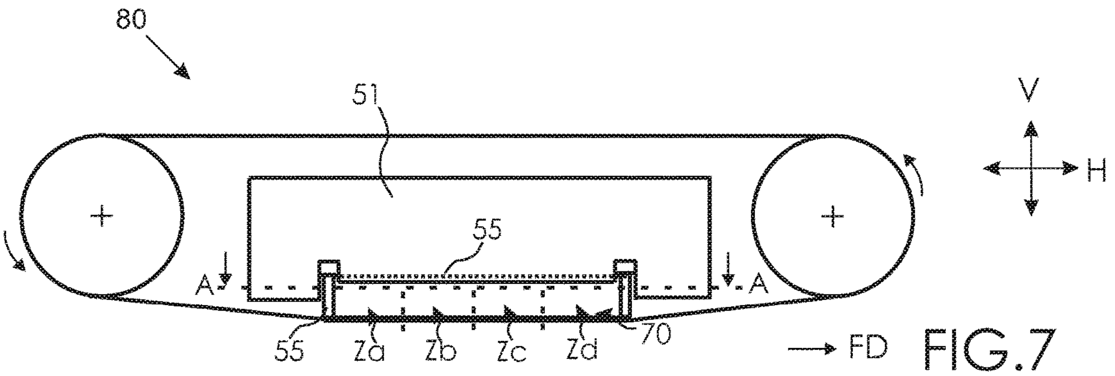
FIG. 7 is a schematic illustration of a continuous press arrangement according to an embodiment of the disclosure.

The press arrangement 80 according to embodiments of the first aspect may comprise one or more controlled temperature zones Za, Zb, Zc, Zd in the feeding direction as shown in FIGS. 7, 8 and 9 in relation to the third aspect. The temperature zones may comprise segments of the press arrangement which can be individually heated or cooled, e.g. by means of circulating air. In particular it may be the press belt that is heated or cooled in the respective temperature zones. The circulating air in each temperature zone may be heated or cooled to facilitate stable curing of the product or reduction of the steam pressure of the product.

According to all aspects, the press belt 40, 41 may also be passively cooled by allowing it cool down by itself. For example, the pressure belt may collect heat from the inlet drum and then passively cool off along the product path. The pressure belt may be passively cooled off e.g. by heat transfer to the product and/or heat radiation to the ambient. Thereby, the energy transferred to the product may be controlled, for example limited such that a desired steam pressure of the product and/or temperature of the core of the product is obtained at the outlet drums. Thus, in this context, passive cooling of the press belt may entail that at least a portion of the press belt is not heated as it propagates along the feeding direction in contact with the product, for example one or more temperature zones may be configured not to transfer heat to the pressure belt.

FIG. 6 shows an exemplary embodiment of a second aspect of the disclosure. The second aspect may advantageously be combined with embodiments of the other aspects disclosed herein, such as the first and/or third aspect. The distance between the inlet drums 42, 43, such as the smallest distance or the distance between their respective longitudinal centre axis Ax1, Ax2, may be adapted to reduce the distance between the press belt 40, 41 and the product 9 upstream the press table 51, optionally upstream the one or more pressure bars P1, P2, which may be provided upstream the press table 51. In a preferred embodiment the distance is adapted such that an angle phi between the product 9 and the press belt 40, 41 is greater than zero and less than 10 degrees.

The angle phi may be in the range of 0.3 to 1.5 degrees, preferably 0.4 to 1 degree, more preferably 0.5 to 0.8 degrees, most preferred about 0.5 degrees. In this respect, the use of a wood veneer may be advantageous since, as mentioned, the wood veneer may isolate the sub-layer and thus protect it from the heat of the press belt 40, 41 downstream the centre axis of the inlet drums Ax1, Ax2. In traditional laminate production, as has explained herein, the surface layer is typically substantially thinner than a wood veneer and may for example typically comprise paper or like. Thus, such thin surface layers may be substantially damaged by heat from the press belt if the angle phi is too small, whereby the press belt is in close proximity of the product. In addition, because such traditional thin surface layer, such as 0.2 mm, may not isolate the sub-layer, pre-heating by reducing the angle phi as explained herein, may not be desired since it may melt and/or destroy the binder.

Preferably, the binder may be heated to a point where it melts or become active only under the influence of pressure, thus in the pressure zone 70, The distance may be adapted such that the position of the first position of contact 3 between the pressure belt and the product occurs earlier and/or is moved upstream in the feeding direction FD, for example when the product moves in the feeding direction. By moving the first position of contact 3 upstream in the feeding direction, it may be facilitated that heat is more efficiently transferred to the product at an earlier instance i.e. upstream. Also, due to the reduced angle phi, thermal radiation may heat the product more efficiently. This configuration may additionally bring about the advantage the product is pre-heated, whereby the binder may become liquid faster.

Thereby, the active area of the pressure zone, i.e. the area in which the binder is in liquid state and the curing process may forego is increased. Because the active area of the pressure zone is increased, it may be facilitated that the pressure zone may be reduced in size, thereby improved economy of the manufacturing process is achieved.

As mentioned, a surface layer in shape of a veneer layer may to some degree isolate the binder from heat. Therefore, when applying a veneer layer to the product such that the binder is comprised in a layer interspaced between the core and the veneer, it may have the effect that more heat is required cause the binder to become liquid. It may thus be advantageous to pre-heat the product.

By adjusting a first position of contact 3 between the press belt and the product and/or by adjusting the vertical position of the one or more of the inlet drums 42, 43 towards the product path a surface layer 12 of the product 9, which may comprise a veneer, may be positioned and/or held in place. Thereby distortion of the shape of the veneer due to exposure to heat may be mitigated or at least to some extent reduced. It is further achieved that heat may be conducted directly from the press belt to the product via conduction. It follows that thereby the heat transferred from the press belt to the product may be increased. Thus, also less heat may be lost due to heat radiation is dissipated to the ambient.

Due to the angle phi being reduced, a larger portion of heat radiation from the press belt may serve to heat the product, thereby product is pre-heated. Due to the angle phi being reduced a greater portion of the press belt may be brought into closer proximity to the product and thus pre-heating is facilitated. Consequently, thereby the distance in the feeding direction downstream the inlet drum required in order for the binder to reach liquid state may be reduced. Thus, the point along the feeding direction where the thermal conductivity is increased due to liquification/phase change of the binder will occur earlier, thereby the "active" portion of the pressure zone available for obtaining a stable curing is increased. In other words, thereby the remaining distance or area i.e. "active area" available to obtain a stable curing may be increased, thereby improved quality of the product.

By adjusting the angle phi and/or adjusting the point of first contact between the press belt and the product, the pressure zone required to obtain a stable curing of the binder may be reduced, thereby the continuous press arrangement may be less costly to manufacture, thereby the process and the building panel may become more economic.

Accordingly, pre-heating of the product may be adapted by adapting the distance between the press belt 40, 41 and the product 9 by adjusting the angle phi.

Accordingly, the angles phi may be adapted to facilitate that a first position of contact 3 between the respective press belts and a product 9 arranged in the product path 6 occurs upstream the press table 51 and downstream a respective centre axis Ax1, Ax2 of the inlet drums.

FIGS. 7, 8 and 9A-C show exemplary embodiments of a third aspect of the disclosure. The third aspect may advantageously be combined with embodiments of the other aspects disclosed herein, such as the first and/or second aspect. In the third aspect there is provided a seal system 53.

In any embodiment of the seal system shown in FIGS. 9A-9C, FIG. 14, FIG. 15, the pressure chamber 59 there may be applied a fluid pressure Pc to the pressure chamber 59. The pressure Pc may be provided as pneumatic or hydraulic pressure. In the embodiment of FIGS. 16A-16B the pressure Pc is provided at least partially by means of a mechanical pressure device.

FIGS. 9A-9C shows exemplary embodiments of a seal system 53 according to the disclosure. The seal member 58 may seal against an external side of the pressure cushion 55 or pressure zone 70 having a first pressure Pa, such as atmospheric pressure, and on an opposite side, such as an inside of the pressure cushion 55 against a second pressure P0, such as the pressure in the pressure zone 70. The pressure gradient between Pc and P0 may be significantly greater then pressure gradient between Pc and Pa, such as 20 times greater. The ratio P0/Pa may be at least 20.

Accordingly, an outer edge portion of the seal member 58, such as in a horizontal direction away from the center of the pressure cushion 55, which seals between Pc and Pa may be subjected to more strain an opposite inner portion sealing between pressure PC and PA due to the displacement of the pressure cushion 55 in combination with the greater pressure gradient. The strain may cause increased wear on the said outer portion of the seal member 58, and may affect the longevity of the seal member 58 negatively.

As discussed, the pressure zone 70 may comprise a pressurizable volume.

The pressurizable volume may be formed on a horizontally inner side of the displacement groove 60, i.e. towards a center of the press table 51. The displacement groove 60 may extend continuously in the press table 51 to form an essentially rectangular groove in the horizontal plane H. The displacement groove 60 may comprise rounded corners in the horizontal plane H, as shown in FIG. 8.

It is emphasized that the seal systems may be configured to facilitate a pressure zone 70, in the shape of a pressurizable space or volume, between the pressure cushion 55, the press table 51 and the press belt 40. The pressure zone 70 may be pressurized, such as filled up, with fluid, such as compressed air or oil.

Figure 14:
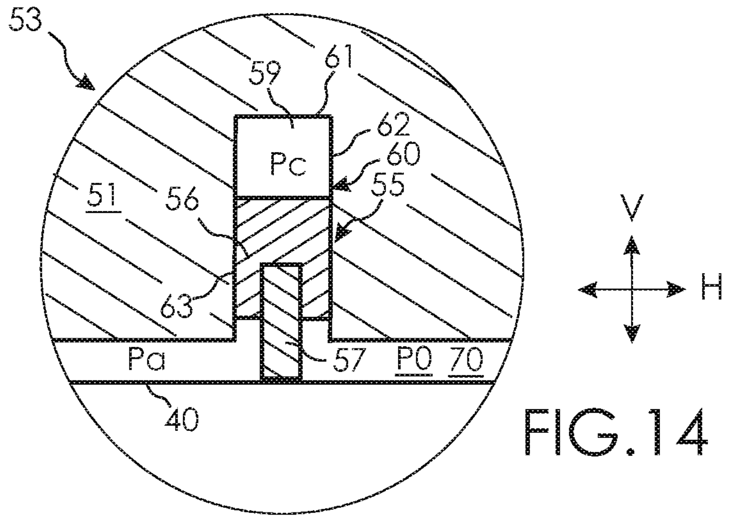
FIG. 14 is a schematic illustration of details of a seal system pressure cushion according to an embodiment.

FIG. 14 shows an exemplary embodiment of a further seal system according to the disclosure. Referring to FIG. 14 the seal member 57 has been omitted. The seal frame 57 is configured seal against the displacement groove. In particular, the seal frame provides a seal between the pressure chamber 59 and pressure Pa, such as ambient pressure. Ambient pressure may be atmospheric pressure. In particular, the seal frame 56 provides a seal between the pressure chamber 59 and pressure P0 in the pressure zone. This may be achieved by configuring the seal frame to have sufficiently small tolerances and/or a tight fit in the displacement groove 60.

Figure 15:
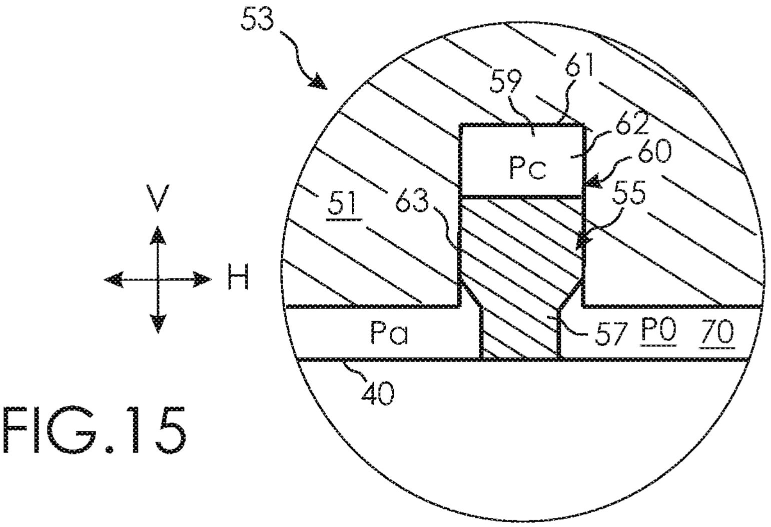
FIG. 15 is schematic illustration of details of a seal system of a pressure cushion according to an embodiment.
Figure 16B:
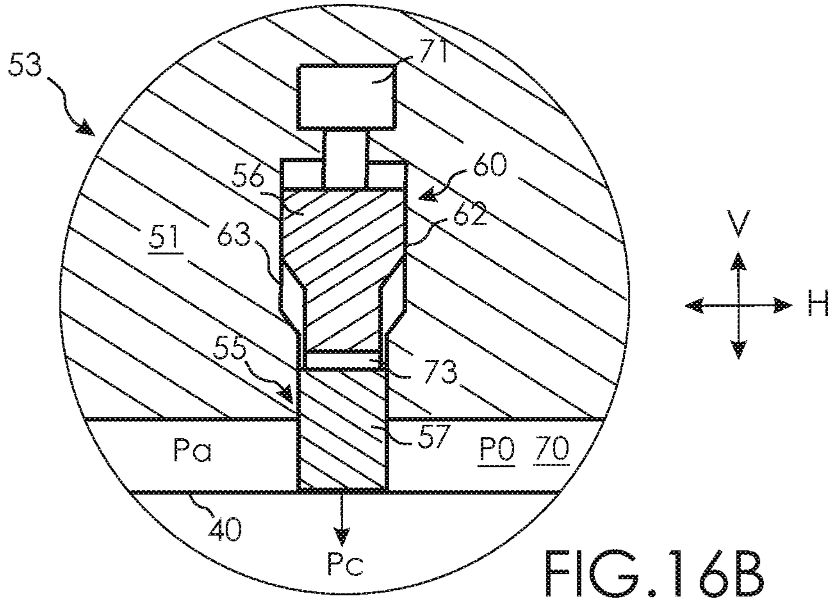
FIG. 16B is a schematic illustration of details of a pressure cushion according to embodiments.
Figure 17:
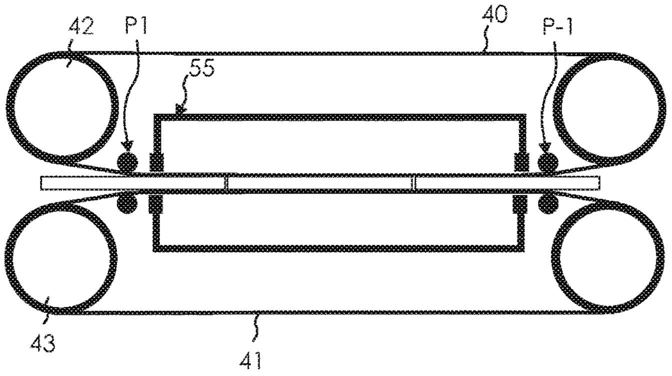
FIG. 17 is a schematic illustration of a continuous press employing isobaric principles.
Figure 18:
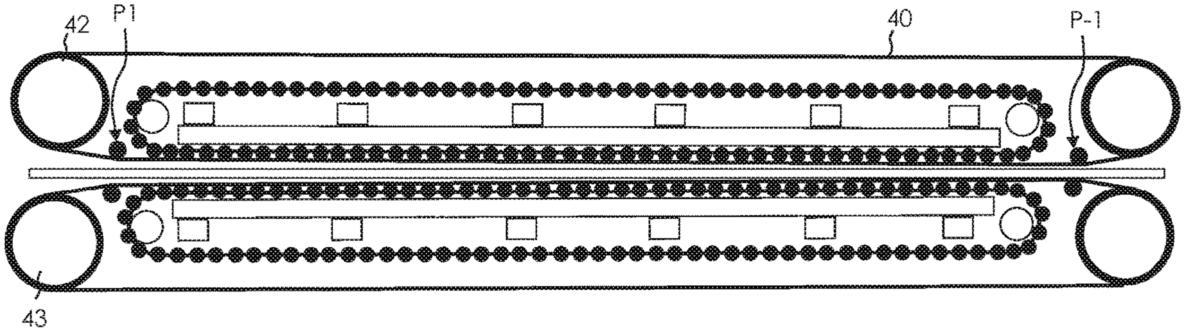
FIG. 18 is a schematic illustration of a continuous press employing isochoric principles.

FIG. 15 shows an exemplary embodiment of a still further seal system according to the disclosure. Referring to FIG. 15, the friction seal element is configured to seal against the displacement groove. In particular, the friction seal element provides a seal between the pressure chamber 59 and pressure Pa, such as ambient pressure. Ambient pressure may be atmospheric pressure. In particular, the friction seal element provides a seal between the pressure chamber 59 and pressure P0 in the pressure zone. This may be achieved by configuring the friction seal element 57 to have sufficiently small tolerances and/or a tight fit in the displacement groove 60.

FIGS. 16A-16B shows an exemplary embodiment of a still further seal system according to the disclosure. Referring to FIG. 16A-16B, the friction seal element 57 is, like in the embodiment of FIG. 15, configured to seal against the displacement groove. In particular, the friction seal element provide a seal between the pressure chamber 59 and pressure Pa, such as ambient pressure. In particular, the friction seal element provides a seal between the pressure chamber 59 and pressure P0 in the pressure zone. This may be achieved by configuring the friction seal element 57 to have sufficiently small tolerances and/or a tight fit in the displacement groove 60. A mechanical pressure device 71 is configured to displace in the displacement groove 60 to thereby apply pressure, such as Pc, to the seal frame 56 such that the seal frame 56 displace in the displacement groove 60. The seal frame 56 is connected to the friction seal element 57 which displaces therewith in response to pressure applied to the seal frame 56. A cushion 73, such as a rubber cushion, may be arranged interspaced between the seal frame 56 and the friction seal element 57. One or more of the seal systems of FIGS. 14-15, 16A-16B may advantageously be combined along the extension of the displacement groove 60, as explained above.

The seal arrangement 53 may be configured to facilitate the pressure zone 70 in a continuous press arrangement. In particular, the seal arrangement may comprise a seal frame 60 configured to be received in a press table 50 of the pressure arrangement 50.

In particular, the seal system may form part of the pressure cushion 55 and comprise a seal frame 56 configured to be received in a press table 51 of the pressure arrangement 50. In particular, the seal system may in some embodiments comprise the seal frame 56 of embodiments of the pressure cushion 55, the seal frame 56 configured to be received in a press table 51 of the pressure arrangement 50.

The seal frame 56 may be configured to linearly translate inside a displacement groove 60 of the press table 51.

The seal frame 56 may be configured to linearly translate at least partially inside a displacement groove 60 of the press table 51.

The displacement groove 60 may comprise an innermost wall 61 with adjacent opposing side walls 62, 63.

The seal frame 56 may comprise a steel frame. The seal frame 56 may have an inner end portion adjacent an innermost wall of the displacement groove 60 and an outer end portion adjacent an opening of the displacement groove.

As schematically illustrated in FIG. 9A-9B, FIG. 14, FIG. 15 and FIGS. 16A-16B, the pressure zone 70 may comprise a sealed volume by means of the friction seal element 57 providing a seal at least between the pressure zone and the ambient pressure Pa by being configured to slidingly seal against the press belt. In some embodiments the seal member 58 provides a seal between the pressure chamber 59 and a seal frame 56, thereby effectively closing off a pressurizable portion of the displacement groove 60 from the pressure zone. In some embodiments, the friction seal member 57 in addition provides a seal between the pressure chamber 59, the pressure zone 70 and the ambient pressure Pa, thereby effectively closing off a pressurizable portion of the displacement groove 60 from the pressure zone 70 and the ambient pressure Pa.

In some embodiments the seal member 58 or friction seal element 57 may seal off an inner wall, such as an innermost wall 61 of the displacement groove 60, against an adjacent inner end portion of the seal frame 56 to form a closed pressure chamber or space. Thus, the pressure chamber 59 may be sealed off from the pressure zone 70. The pressure chamber 59 may be configured to be pressurized, e.g. by means of pneumatic pressure or hydraulic pressure. By providing a pressure chamber 59 configured to be pressurized, it may be facilitated that the seal member 58 and seal frame 56 and/or the friction seal element 57 may be displaced under the action of pressure extorted by the pressure in the pressure chamber 59. It is thereby facilitated that the friction seal 57, which is preferably arranged in close proximity of the press belt 40, 41, may be brought into abutment with and apply a clamping pressure corresponding to Pc to the press belt 40, where Pc is dependent on the pressure provided to the pressure chamber 59.

The clamping pressure Pc may preferably be greater than the working pressure P0 provided in the pressure zone 70. For example, the clamping pressure Pc may be approximately 40 bar and the working pressure P0 approximately 35 bar.

The friction seal element 57 may comprise a composite, such as a low friction composite, e.g. a graphite composite capable of withstanding temperatures of at least 250 deg. C.

The seal member 58 may comprise a gasket, such as a rubber gasket.

The seal member 58 may comprise a substantially U-shaped cross-section which is upwards open towards the inner wall 61 of the displacement groove.

The seal member 58 may comprise a substantially U-shaped cross-section which is upwards open towards the pressure chamber 59. Thereby, a pressure, such as a fluid pressure, inside the U-shaped seal member 58 may cause the U-shaped seal member to be urged towards the side walls 62, 63 of the displacement groove 60. Thereby, an improved sealing function may be facilitated.

The U-shaped seal member 58, as derivable from FIGS. 9A-9C comprises two parallel walls configured to extend parallel respective side walls 62, 63 of the displacement groove 60. Thereby, a pressure, such as a fluid pressure in the pressure chamber 59 and inside the U-shaped seal member 58 may cause the U-shaped seal member to be urged towards the side walls 62, 63 of the displacement groove 60. Thereby, an improved sealing function may be facilitated.

In particular, side wall **58*a* of the seal member 58 may be urged towards the side wall 63 or the displacement groove 60 and side wall 58*b* of the seal member 58 may be urged towards side wall 62 of the displacement groove 60**.

The seal member 58 may be at least partially sandwiched between a bar **58*c*, such as a steel bar, and the seal frame 56. The bar 58*c* may be arranged inside the U-shaped seal member 58 and be attached to the seal frame 56, for example by fastening means extending through the seal member 58**. Fastening means may comprise bolts, screws or like.

Thereby, a secured position and orientation of the seal member in the displacement groove may be facilitated.

The seal member 58 may comprise a non-symmetric shape. Due to the non-symmetric shape it may be advantageous to secure the orientation of the seal member in the displacement groove.

The displacement groove 60, the seal frame 56, the seal member 58 and the friction seal element 57 may extend continuously along the periphery of the pressure cushion 55 as shown in FIG. 8. The friction seal element 57 may constitute a lowermost, optionally also an outermost portion of the pressure cushion.

The displacement groove 60 may be tapered, such as to become narrower in a, for example in a stepwise manner, in a direction from the opening of the groove towards the inner wall 61. A portion of the displacement groove 60 adjacent the inner surface may comprise a smaller cross sectional area, in a horizontal plane H, and a portion of the displacement groove adjacent the opening may have a larger cross sectional area. The seal frame may comprise a shape corresponding to the shape of the displacement groove.

An outer end of the seal frame may comprise means for attaching the friction seal element, such as a fixing groove configured to receive the seal member, for example slidingly receive.

The seal member may be fixed to the seal frame and may thus translate, preferably linearly translate, with the seal frame 56. The seal member is preferably configured to abut the press belt.

An outer end of the friction seal element 57 may be arranged outside the displacement groove, an inner end of the seal member may be arranged inside the displacement groove. The entire seal frame may be arranged inside the displacement groove.

The seal frame may be configured to displace in the displacement groove under the action of a fluid pressure in the pressure chamber 59, such as pneumatic pressure. The seal member may be caused to translate in a direction towards the press belt in response to a fluid pressure applied to the pressure chamber 59.

The pressure arrangement 50 is configured to apply a clamping pressure Pc to the press belt via the friction seal element 57. The clamping pressure Pc may correspond to the pressure provided to the pressure chamber 59.

According to the disclosure, the pressure cushion 55 may comprise combinations of any of the embodiments of the seal systems shown FIG. 8, FIG. 9A-9B, FIG. 14, FIG. 15 and FIGS. 16A-16B, Thus, according to embodiments, one or more sections of the pressure cushion 55 may comprises different seal systems, such as for sealing between Pc and Pa and P0 respectively.

For example, as shown in FIG. 8 and FIG. 16A, a corner section 78 of the pressure cushion 55, such as a corner section 78 where a vertical displacement of the pressure cushion 55 is greatest, such as closest to the inlet drums 42, 43, may comprise a seal system being different from a further section 79, such as a section of a long edge of the pressure cushion 55.

In other words, in a non-limiting example the cross-section B-B (See FIG. 8) taken on a long side of the pressure cushion 55 may comprise an embodiment of the seal system shown in FIG. 9A-9B, FIG. 14, FIG. 15 and FIGS. 16A-16B and the cross-section C-C (see FIG. 8, FIG. 16A) taken in a corner section 78 of the pressure cushion 55 may comprise an embodiment of the seal system shown in FIG. 9A-9B, FIG. 14, FIG. 15 and FIGS. 16A-16B, which may be different from the seal system of cross section B-B.

Referring to FIG. 10 there is shown an embodiment of a fourth aspect of the disclosure, comprising a continuous press arrangement 80''' combining any embodiments of one or more of the first aspect, the second aspect and the third aspect. As derivable from FIG. 10, the at least one pressure bar P1, P2 may be provided in the press table 51 at a position upstream the pressure cushion 55. In particular, the at least one pressure bar P1, P2 may be provided in the press table 51 at a position upstream the pressure cushion 55 in the feeding direction FD, preferably upstream the entire pressure cushion 55.

As derivable from FIG. 10, further pressure bars P-1, P-2 may be provided in the press table 51 at respective positions downstream the pressure cushion 55. In particular, further pressure bars P-1, P-2 may be provided in the press table 51 at respective positions downstream the pressure cushion 55 in the feeding direction FD, preferably downstream the entire pressure cushion 55

It follows that the pressure bars may preferably be provided outside the pressure zone 70 provided within the seal frame 56 of the pressure cushion 55.

Figure 11:
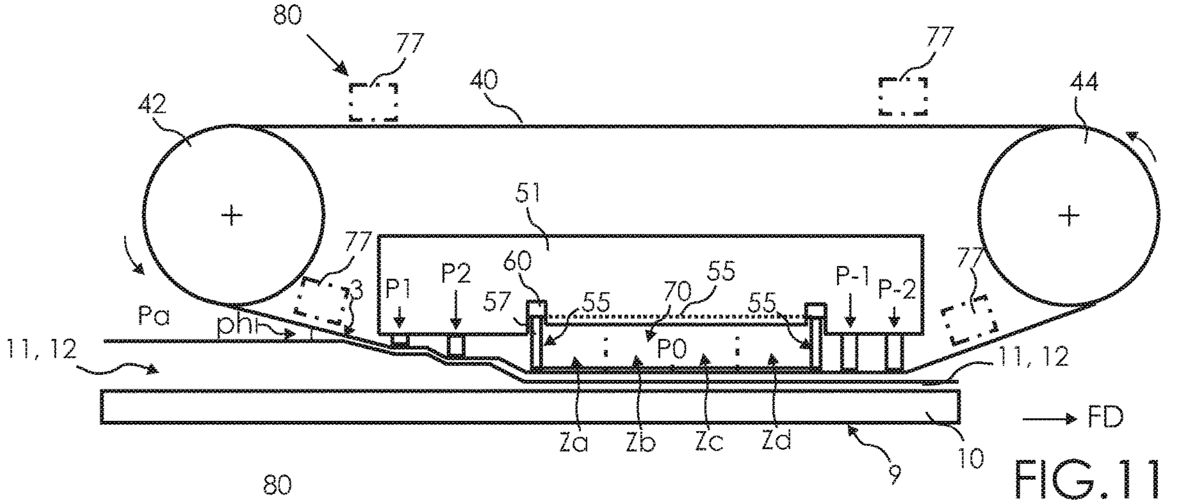
FIG. 11 shows a continuous press arrangement comprising induction heating according an embodiment of the present disclosure.

Referring to FIG. 11 there is shown an embodiment of a fifth aspect of the disclosure, comprising a continuous press arrangement 100 wherein any embodiments of the first aspect and optionally any embodiments of the second aspect may be combined in a separate continuous pre-press 81 followed by, in the feeding direction, a further continuous press 82 which may comprise any embodiments of the third aspect.

Items

ITEM 1. A continuous press arrangement 80 for manufacture of building panels, such as floor or wall panels, comprising:

an upper rotatable inlet drum 42 connecting to an upper rotatable outlet drum 44 via an upper continuous press belt 40 and a lower rotatable inlet drum 43 connecting to a lower rotatable outlet drum 45 via a lower continuous press belt 41; said upper and lower press belts configured to form a product path 6 there between for feeding a product 9 in a feeding direction FD in response to rotation of said drums or displacement of said press belt(-s);

an upper and a lower press table 51, 51', each comprising at least one displaceable pressure cushion 55 configured to be displaced into sealing abutment with the press belt 40, 41 for facilitating a pressure zone 70 preferably in shape of a pressurizable volume extending along at least a portion of said path 6.

ITEM 2. Arrangement according to item 1, wherein the arrangement 80 comprises one or more pressure bars P1, P2, P3, P-1, P-2, P-3 disposed upstream and/or downstream the pressure cushion 55, in the feeding direction FD, wherein said one or more pressure bars are configured to apply a pressure to the upper press belt and/or the lower press belt respectively in a direction towards the product path.

ITEM 3. Arrangement according to item 2, wherein said pressure bar(-s) are provided in the press table 51, 51' and/or between the press table 51 and the inlet drum 42 and/or between the press table 51 and the outlet drum 44.

ITEM 4. Arrangement according to any one of the preceding items 2 or 3, wherein said pressure bar(-s) extends in a horizontal H plane and in a direction transverse the feeding direction FD, preferably at least along the entire the pressure cushion, more preferably at least along a friction seal member 57 of the pressure cushion 55.

ITEM 5. Arrangement according to any one of the preceding items 2 to 4, wherein one or more of said pressure bar(-s) are configured to pre-compress the product 9 when being fed in the product path 6, at a position upstream said pressure zone 70, preferably upstream said pressure cushion 55, and downstream a respective centre axis Ax1, Ax2 of said inlet drums in the feeding direction.

ITEM 6. Arrangement according to any one of the preceding items 2 to 5 wherein the one or more pressure bars constitute non-rotating members attached to the press table and configured to slide against the press belt in response to rotation of said drums 42, 43, 44, 45.

ITEM 7. Arrangement according to any one of the preceding items 2 to 6, wherein the one or more pressure bars constitute rotatable members attached to the press table and configured to roll against the press belt in response to rotation of said drums 42, 43, 44, 45.

ITEM 8. Arrangement according to any one of the preceding items 2 to 7, wherein the one or more of the pressure bars are arranged in successive sequence in the feeding direction.

ITEM 9. Arrangement according to any one of the preceding items 2 to 8, wherein a subsequent pressure bar P2 of a sequence of pressure bars arranged upstream the pressure cushion P1, P2, P3, in a feeding direction, is configured to apply a pressure at least equal to, preferably exceeding the pressure exerted by a preceding pressure bar P1 in said sequence.

ITEM 10. Arrangement according to any one of the preceding items 2 to 9, wherein a subsequent pressure bar (P-2) in a sequence of pressure bars P-1, P-2, P-3 arranged downstream said pressure cushion is configured to apply a pressure no greater than, preferably a pressure of less magnitude than the pressure exerted by a preceding pressure (P-1) bar in said sequence.

ITEM 11. Arrangement according to any one of the preceding items 2 to 10, wherein a fluid pressure acting on said pressure bars is individually controlled for one or more of the pressure bars.

ITEM 12. Arrangement according to any one of the preceding items 1 to 11, wherein the product 9 comprises a core 9, a sub-layer 11 provided on the core 9, and a surface layer 12 provided on the sub-layer.

ITEM 13. Arrangement according to item 12, wherein said one or more pressure bars are configured to control deairing of said product 9, such as a sub-layer (11) comprising powder or granulate.

ITEM 14. Arrangement according to any one of the preceding items 2 to 13, wherein said one or more pressure bars are configured to apply a compressing pressure corresponding to 50-80% of a working pressure (P0) applied by the pressure zone 70, preferably 60 to 80%, more preferably 70-80%.

ITEM 15. Arrangement according to any one of the preceding items 2 to 14, wherein said one or more pressure bars are configured to facilitate pre-heating of the product upstream the pressure cushion (55) by means of urging the press belt towards the product.

ITEM 16. Arrangement according to any one of the preceding items 1 to 15, wherein said pressure zone (70) is a pressurizable volume formed between the pressure cushion (55) and the press belt (40), said pressurizable space configured to be pressurized by means of pneumatic pressure.

ITEM 17. Arrangement according to any one of the preceding items 1 to 16, wherein said pressure cushion (55) is configured to be displaced vertically into sealing abutment with the press belt (40) for facilitating said pressure zone (70), whereby the pressure zone (70) comprises a sealed volume.

ITEM 18. Arrangement according to any one of the preceding items 2 to 17, wherein one or more of the pressure bars comprises at least one circular cross-section, such as provided in the shape of a cylinder, such as a rotatable cylinder.

ITEM 19. Arrangement according to any one of the preceding items 2 to 18, wherein one or more pressure bars are movably attached to the press table, preferably in a vertical direction.

ITEM 20. Arrangement according to any one of the preceding items 2 to 19, wherein said one or more pressure bars comprises a material resistant preferably to at least 250 deg. C. temperature, such as a composite, such as a composite comprising carbon, such as graphite.

ITEM 21. Arrangement according to any one of the preceding items 2 to 20, wherein one or more of said pressure bars are configured to apply pressure to the press belt by means of fluid pressure acting on said pressure bars, such as pneumatic pressure, such as air, or hydraulic pressure, such as hydraulic fluid or oil.

ITEM 22. Arrangement according to the preceding item 21, wherein said fluid pressure acting on said pressure bars is individually controlled for one or more of the pressure bars.

ITEM 23. Arrangement according to any one of the preceding items 2 to 22, wherein said one or more pressure bars are configured to apply a compressing pressure corresponding to 50-95% of a pressure Pc applied by the pressure cushion to the press belt, preferably 60 to 90%, more preferably 75-85%.

ITEM 24. The arrangement according to any one of the preceding items 1 to 23, wherein said product path has a height measured from the lower press belt to the upper press belt and a width extending in a horizontal direction transverse the feeding direction.

ITEM 25. The arrangement according to any one of the preceding items 1 to 24, wherein each press belt extends continuously about the respective press table 51, 51'.

ITEM 26. Arrangement according to any one of the preceding items 12 to 25, wherein said one or more pressure bars are configured to continuously expel air from one or more sub-layer 11 of a product 9 while being fed through the product path 6.

ITEM 27. Arrangement according to any one of the preceding items 12 to 26, wherein said pressure cushion 55 is configured to reduce the thickness of the sub-layer 11 and/or a surface layer 12 of the product 9 and/or the height of said product path 6.

ITEM 28. Arrangement according to any one of the preceding items 2 to 27, wherein one or more of the pressure bars are received in respective grooves in the press table.

ITEM 29. Arrangement according to any one of the preceding items 2 to 28, wherein one or more of the pressure bars are arranged between press table 51 and said inlet drum 42.

ITEM 30. Arrangement according to any one of the preceding items 2 to 29, wherein one or more pressure bars are arranged between press table 51 and said outlet drum 44.

ITEM 31. Arrangement according to any one of the preceding items 1 to 30, wherein said press table 51, 51' comprises a displacement groove 60 and said pressure cushion 55 is configured to be at least partially received in said displacement groove 60.

ITEM 32. Arrangement according to any one of the preceding items 1 to 31, wherein said pressure cushion 55 comprises a friction seal element 57 configured to be in contact with the press belt.

ITEM 33. The continuous press arrangement 80 according to any one of the preceding items 1 to 32, wherein said pressure cushion 55 is configured to displace in a vertical direction V towards the press belt in response to a pressure applied to said displacement groove 60.

ITEM 34. The continuous press arrangement 80 according to any one of the preceding items 1 to 33, wherein said pressure cushion 55 is configured to displace in a vertical direction V towards the press belt in response to a pressure applied to a pressure cushion 55, preferably via said displacement groove 60.

ITEM 35. Arrangement according to any one of the preceding items 32 to 34, wherein said seal member 58 and/or seal frame 56 and/or friction seal element 57 sealingly separates a pressure chamber 59 and the pressure zone 70, wherein said pressure applied to said pressure cushion 55 is applied via the pressure chamber 59.

ITEM 36. The arrangement according to the preceding item 35, wherein said seal member 58 and/or seal frame and/or friction seal element 57 is configured to form said pressure chamber 59 with an inner wall 61, 62, 63 of the displacement groove 60.

ITEM 37. The continuous press arrangement 80 according to any one of the preceding items 1 to 36, wherein said pressure cushion 55 comprises a seal frame 56 configured to be received in said displacement groove 60.

ITEM 38. The continuous press arrangement 80 according to any one of the preceding items 1 to 37, wherein said seal frame 56 is configured to displace in a vertical direction V in said displacement groove 60 in response to a pressure applied to said displacement groove 60.

ITEM 39. The continuous press arrangement 80 according to any one of the preceding items 3 to 38, wherein the seal frame 56 is configured to be connected to the friction seal element 57.

ITEM 40. The continuous press arrangement 80 according to any one of the preceding items 32 to 39, wherein the seal frame 56 is configured to seal against the pressure applied to said displacement groove 60, such as against a fluid creating the pressure.

ITEM 41. The continuous press arrangement 80 according to any one of the preceding items 32 to 30, wherein the seal frame 56 is configured to be connected to a seal member 58, wherein the seal member 58 is configured to seal against the pressure applied to said displacement groove 60, such as against a fluid creating the pressure.

ITEM 42. The continuous press arrangement 80 according to any one of the preceding items 34 to 41, wherein the pressure applied to said displacement groove 60 or pressure chamber 59 is provided in the form of pneumatic pressure, such as pressurized fluid, such as pressurized air.

ITEM 43. The continuous press arrangement 80 according to any one of the preceding items 34 to 42, wherein the pressure applied to said displacement groove 60 or pressure chamber 59 is provided by in the form of hydraulic pressure, such as a hydraulic fluid, such as water or oil.

ITEM 44. The continuous press arrangement 80 according to any one of the preceding items 34 to 43, wherein the friction seal element 57 is configured to seal against the pressure applied to said displacement groove 60, such as against a fluid creating the pressure.

ITEM 45. The continuous press arrangement 80 according to any one of the preceding items 34 to 44, wherein the pressure applied to the pressure cushion 55 is provided by means of a mechanical device 71, such as a hydraulic spring, displaceable in said displacement groove.

ITEM 46. The continuous press arrangement 80 according to any one of the preceding items 1 to 45, wherein the product 9 is a laminate product comprising one or more sub-layers 11 and one or more surface layer(-s) 12.

ITEM 47. The continuous press arrangement 80 according to any one of the preceding items 1 to 46, wherein one or more of the surface layer(-s) 12 comprises veneer.

ITEM 48. The continuous press arrangement 80 according to any one of the preceding items 1 to 47, wherein one or more of the sub-layers 11 are interposed between a surface layer 12 and a core 10 of the product 9, wherein the sub-layer 11 is provided in the form of powder.

ITEM 49. The arrangement according to any one of the preceding items 37 to 48, wherein said seal member 58 is attached to said seal frame 56 and configured to displace with the seal frame while sealing against inner walls 62, 63 of the displacement groove 60.

ITEM 50. The arrangement according to any one of the preceding items 32 to 49, wherein said seal member 58 or seal frame 56 or friction seal element 57 is configured to seal off an inner wall 61, 62, 63, such as an innermost wall 61 or a bottom wall of the displacement groove, from the pressure zone 70. ITEM 51. The arrangement according to any one of the preceding items 35 to 50, wherein the pressure chamber 59 is configured to be pressurized, e.g. by means of being configured to be in fluid connection with a source of fluid pressure, such as pneumatic pressure, such as an accumulator and/or compressor.

ITEM 52. The arrangement according to any one of the preceding items 37 to 51, wherein said seal frame 56 is configured to displace to bring the friction seal element 57 into abutment with said pressure belt for facilitating sealing of the pressure zone 70 formed between said press belt, the pressure cushion 55 and the press table 51.

ITEM 53. The arrangement according to any one of the preceding items 32 to 52, wherein the friction seal element 57 comprises a composite, such as composite comprising carbon, for example a graphite composite.

ITEM 54. The arrangement according to any one of the preceding items 31 to 53, wherein the displacement groove 60 extends continuously along and essentially parallel the outer edges of the press table 51.

ITEM 55. The arrangement according to any one of the preceding items 36 to 54, wherein the seal member 58 comprises a gasket, such as a rubber gasket, configured to slidingly seal against inner walls of the displacement groove.

ITEM 56. The arrangement according to any one of the preceding items 1 to 55, wherein the inlet drums are configured to form respective angles phi between the respective press belts 40, 41 and the product path 6 at a position being downstream the inlet drums and upstream the pressure cushion 55 or press table 51, in the feeding direction FD.

ITEM 57. Arrangement according to item 56, wherein said angle phi is greater than zero.

ITEM 58. Arrangement according to any one of the preceding items 56 or 57, wherein the size of the angles phi is adapted by adapting a distance between the respective centre axis Ax1, Ax2 of the inlet drums, such as a vertical V distance.

ITEM 59. Arrangement according to any one of the preceding items 56 to 58, wherein said angles phi are adapted to facilitate that a first position of contact 3 between the respective press belts 40, and a product 9 arranged in the product path 6 occurs upstream the pressure cushion 55, preferably upstream the press table 51, and downstream a respective centre axis Ax1, Ax2 of the inlet drums.

ITEM 60. Arrangement according to any one of the preceding items 56 to 59, wherein the angle phi is in the range of 0.3 to 1.5 degrees, preferably 0.4 to 1 degree, more preferably 0.5 to 0.8 degrees.

ITEM 61. A method of manufacture of building panels 1, such as floor or wall panels, by means of a continuous press arrangement 80 having an upper rotatable inlet drum 42 connected to an upper rotatable outlet drum 44 via an upper continuous press belt 40 and a lower rotatable inlet drum 43 connected with a lower rotatable outlet drum 45 via a lower continuous press belt 41; said upper and lower press belts configured to form a product path 6 there between for feeding a product in a feeding direction FD in response to rotation of said drums; an upper and a lower press table 51 each comprising a displaceable pressure cushion 55 configured to facilitate a pressure zone 70 extending along at least a portion of said path 6.

ITEM 62. The method according to item 61, comprising providing one or more pressure bars P1, P2, P3 at one or more positions upstream said pressure cushion and downstream inlet drums 42, 43 of said press arrangement 80, in the feeding direction;

configuring said pressure bars to successively pre-compress said product 9 along the feeding direction to thereby reduce a thickness thereof.

ITEM 63. The method according to item 61 or 62, further comprising providing a product comprising a core 10, a sub-layer 11 and a surface layer 12 on said sub-layer 11;

feeding said product in a feeding direction FD to a product path 6 of said continuous press arrangement.

ITEM 64. The method according to item 63, wherein said sub-layer 11 comprises a powder and/or a granulate.

ITEM 65. The method according to item 63, wherein said surface layer 12 comprises a veneer layer, such as a wood veneer, and/or a paper layer.

ITEM 66. The method according to any one of items 61 to 65, further comprising:

providing one or more pressure bars P-1, P-2, P-3 at one or more positions downstream said pressure cushion 55 in the feeding direction FD;

configuring said pressure bars P-1, P-2, P-3 arranged downstream said pressure cushion to apply successively reduced pressures to said product along the feeding direction.

ITEM 67. The method according to any one of the preceding items 61 to 66, wherein an angle phi is formed between the press belt 40 and the product 9 at a position downstream a centre axis Ax1, Ax2 of the inlet drums 42, 43 in the feeding direction, and upstream the pressure cushion 55, preferably upstream the press table 51.

ITEM 68. The method according to item 67, further comprising adapting a position of first contact 3 between the product 9 and the press belt 40, 41, in the feeding direction, by adapting the angle phi.

ITEM 69. The method according to item 67 or 68, further comprising adapting pre-heating of the product 9 by adapting the distance between the press belt and the product by adjusting the angle phi.

ITEM 70. The method according to any one of the preceding items 67 to 69, wherein said angles phi are adapted to facilitate that a first position of contact 3 between the respective press belts and a product 9 arranged in the product path occurs upstream the pressure cushion and downstream a respective centre axis Ax1, Ax2 of the inlet drums.

ITEM 71. The method according to item 68 to 70, wherein adapting the angle (phi) comprises adapting a vertical position of the inlet drum 42, 43.

ITEM 72. The method according to any one of items 67 to 71, wherein the angle phi is in the range of 0.3 to 1.5 degrees, preferably 0.4 to 1 degree, more preferably 0.5 to 0.8 degrees.

ITEM 73. The method according to any one of the preceding items 67 to 72, wherein said first layer comprises a powder or granulate.

ITEM 74. The method according to any one of the preceding items 67 to 73, wherein providing the first layer 11 is followed by providing a second layer 12, such as a veneer or paper layer, on to said first layer (11).

ITEM 75. The method according to any one of the preceding items 67 to 74, further comprising providing a backing layer 15 to said product, said backing layer being provided on a side of the board being opposite the first layer, preferably said backing layer comprises a sub-layer 11 and a surface layer 12.

ITEM 76. A continuous press arrangement 80 for manufacture of building panels, such as floor or wall panels, comprising:

an upper rotatable inlet drum 42 connecting to an upper rotatable outlet drum 44 via an upper continuous press belt 40 and a lower rotatable inlet drum 43 connecting to a lower rotatable outlet drum 45 via a lower continuous press belt 41; said upper and lower press belts configured to form a product path 6 there between for feeding a product 9 in a feeding direction FD in response to rotation of said drums; an upper and a lower press table 51, 51", one or more of said press tables comprising a displaceable pressure cushion 55 configured to facilitate a pressure zone 70 extending along at least a portion of said path 6, wherein at least one of said press tables 51, 51" comprises one or more pressure bars P1, P2, P3, P-1, P-2, P-3 disposed upstream the pressure cushion, in the feeding direction, wherein said one or more pressure bars are configured to apply a pressure to the upper press belt and/or the lower press belt respectively in a direction towards the product path, wherein the arrangement comprises a continuous pre-press device 81, wherein said pressure bars are provided in the press table 51" of the pre-press device 81.

ITEM 77. A continuous pre-press device 81 for use in in the arrangement according to item 69, said device comprising:

an upper rotatable inlet drum 42" connecting to an upper rotatable outlet drum 44" via an upper continuous press belt 40" and a lower rotatable inlet drum 43" connecting to a lower rotatable outlet drum 45" via a lower continuous press belt 41"; said upper and lower press belts configured to form a product path 6 there between for feeding a product 9 in a feeding direction FD in response to rotation of said drums; an upper and a lower press table 51"; wherein at least one of said press tables 51" comprises one or more pressure bars P1, P2, P3 disposed upstream the pressure cushion, in the feeding direction, wherein said one or more pressure bars are configured to apply a pressure to the upper press belt 40" and/or the lower press belt 41" respectively in a direction towards the product path.

ITEM 78. The arrangement according to any one of the preceding items 1 to 60, wherein at least one of the upper press belt 40 and/or lower press belt 41 are at least partially heated by means of one or more induction heating devices 77.

ITEM 79. The arrangement according to the preceding item 78, wherein the induction heating device 77 is provided on an inside 40*b*, 41*b* of the upper press belt 40 and/or lower press belt 41.

ITEM 80. The arrangement according to any one of the preceding items 78 to 79, wherein the induction heating device 77 is provided between the press table 51, 51' and the inlet drum 42, 43.

ITEM 81. The arrangement according to any one of the preceding items 78 to 80, wherein the induction heating device 77 is provided between the press table 51, 51' and the outlet drum 44, 45.

ITEM 82. The arrangement according to any one of the preceding items 78 to 81, wherein the induction heating device 77 is provided between the upper inlet drum 42 and the upper outlet drum 44 and/or between the lower inlet drum 43 and the lower outlet drum 45.

The invention claimed is:

1. A continuous press arrangement for manufacture of building panels, comprising:

an upper rotatable inlet drum connecting to an upper rotatable outlet drum via an upper continuous press belt and a lower rotatable inlet drum connecting to a lower rotatable outlet drum via a lower continuous press belt, said upper and lower press belts configured to form a product path therebetween for feeding a product in a feeding direction in response to rotation of said drums or displacement of said press belts;

an upper press table and a lower press table, each comprising at least one displaceable pressure cushion configured to be displaced into sealing abutment with the press belt for facilitating a pressure zone configured to be filled by pneumatic or hydraulic pressure for pressurization, an entire perimeter of the pressure zone being delimited by the pressure cushion;

wherein the arrangement comprises one or more pressure bars disposed upstream and/or downstream of an entirety of the pressure cushion and of an entirety of the pressure zone, in the feeding direction, wherein said one or more pressure bars are configured to apply a pressure to the upper press belt and/or the lower press belt respectively in a direction towards the product path, wherein the pressure applied by the one or more pressure bars is less than a working pressure applied by the pressure zone.

2. The arrangement according to claim 1, wherein one or more of said pressure bars are provided in the press table and/or between the press table and the inlet drum and/or between the press table and the outlet drum.

3. The arrangement according to claim 1, wherein said pressure bars extend in a horizontal plane and in a direction transverse the feeding direction.

4. The arrangement according to claim 1, wherein one or more of said pressure bars are configured to pre-compress the product when being fed in the product path, at a position upstream said pressure zone and downstream a respective centre axis of said inlet drums in the feeding direction.

5. The arrangement according to claim 4, wherein the one or more pressure bars comprise non-rotating members attached to the press table and configured to slide against the press belt in response to rotation of said drums.

6. The arrangement according to claim 4, wherein the one or more pressure bars comprise rotatable members configured to roll against the press belt in response to rotation of one or more of said drums.

7. The arrangement according to claim 4, wherein the one or more of the pressure bars are arranged in successive sequence in the feeding direction.

8. The arrangement according to claim 1, wherein a subsequent pressure bar of a sequence of pressure bars arranged upstream the pressure cushion, in a feeding direction, is configured to apply a pressure at least equal to the pressure exerted by a preceding pressure bar in said sequence.

9. The arrangement according to claim 1, wherein one or more pressure bars comprises a material comprising a composite.

10. The arrangement according to claim 1, wherein a fluid pressure acting on said pressure bars is individually controlled for one or more of the pressure bars.

11. The arrangement according to claim 10, wherein said one or more pressure bars are configured to control deairing of said product.

12. The arrangement according to claim 1, wherein one or more of said pressure bars are configured to apply a compressing pressure corresponding to 50-80% of the working pressure applied by the pressure zone.

13. The arrangement according to claim 1, wherein said one or more pressure bars are configured to facilitate preheating of the product upstream the pressure cushion by urging the press belt towards the product.

14. The arrangement according to claim 1, wherein said pressure zone is a pressurizable volume formed between the pressure cushion and the press belt, said pressurizable volume configured to be pressurized by pneumatic pressure.

15. The arrangement according to claim 1, wherein said pressure cushion is configured to be displaced vertically into sealing abutment with the press belt for facilitating said pressure zone, whereby the pressure zone comprises a sealed volume.

16. The arrangement according to claim 1, wherein one or more of the pressure bars comprises at least one circular cross-section.

17. The arrangement according to claim 1, wherein one or more of the pressure bars comprise at least one rectangular cross-section.

18. The arrangement according to claim 1, wherein the continuous press arrangement is configured to compress the product or reduce the thickness of the product by up to 20%.

19. The arrangement according to claim 1, wherein one or more pressure bars and the one or more pressure cushion are configured to aggregately compress the product or reduce the thickness of the product by up to 20%.

20. The arrangement according to claim 1, wherein one or more pressure bars and the one or more pressure cushion may successively reduce the thickness to an aggregated reduction in thickness of the product by at least 10%.

21. The arrangement according to claim 1, wherein one or more pressure bars and the one or more pressure cushion are configured to obtain an aggregated compression of the product or reduction in the thickness of the product by up to 1 mm.

22. The arrangement according to claim 1, wherein the one or more pressure bars and the one or more pressure cushion are configured to successively reduce the thickness of the product to obtain an aggregated reduction in thickness of the product by at least 1 mm.

23. The arrangement according to claim 1, wherein the one or more pressure bars is disposed between one of said drums and the entirety of the pressure cushion.

24. A continuous press arrangement for manufacture of building panels, comprising:

an upper rotatable inlet drum connecting to an upper rotatable outlet drum via an upper continuous press belt and a lower rotatable inlet drum connecting to a lower rotatable outlet drum via a lower continuous press belt, said upper and lower press belts configured to form a product path therebetween for feeding a product in a feeding direction in response to rotation of said drums or displacement of said press belts;

an upper press table and a lower press table, each comprising at least one displaceable pressure cushion configured to be displaced into sealing abutment with the press belt for facilitating a pressure zone configured to be filled by pneumatic or hydraulic pressure for pressurization, an entire perimeter of the pressure zone being delimited by the pressure cushion;

wherein the arrangement comprises one or more pressure bars disposed upstream and/or downstream of an entirety of the pressure cushion and of an entirety of the pressure zone, in the feeding direction, wherein said one or more pressure bars are configured to apply a pressure to the upper press belt and/or the lower press belt respectively in a direction towards the product path, and wherein a subsequent pressure bar in a sequence of pressure bars arranged downstream said pressure cushion is configured to apply a pressure no greater than the pressure exerted by a preceding pressure bar in said sequence.

* * * * *